United States Patent [19]
Mutoh et al.

[11] Patent Number: 5,379,423
[45] Date of Patent: Jan. 3, 1995

[54] INFORMATION LIFE CYCLE PROCESSOR AND INFORMATION ORGANIZING METHOD USING IT

[75] Inventors: Hideo Mutoh, Yokohama; Keiji Moki, Kawasaki; Takehiko Shibayama, Yamato, all of Japan

[73] Assignees: Hitachi, Ltd.; Hitachi Microcomputer Engineering Ltd., both of Tokyo; Hitachi Chubu Software, Ltd., Aichi, all of Japan

[21] Appl. No.: 70,634

[22] Filed: Jun. 1, 1993

Related U.S. Application Data

[63] Continuation of Ser. No. 413,313, Sep. 27, 1989, abandoned.

[30] Foreign Application Priority Data

Sep. 28, 1988 [JP] Japan ................................ 63-241129
Sep. 29, 1988 [JP] Japan ................................ 63-245445

[51] Int. Cl.⁶ ...................... G06F 12/14; G06F 13/14
[52] U.S. Cl. .................... 395/600; 364/962.1; 364/963; 364/DIG. 2
[58] Field of Search .................. 395/600, 650, 700

[56] References Cited

U.S. PATENT DOCUMENTS

| | | | |
|---|---|---|---|
| 4,751,635 | 6/1988 | Kret | 364/200 |
| 5,008,853 | 4/1991 | Bly et al. | 364/900 |
| 5,014,192 | 5/1991 | Mansfield et al. | 364/200 |

OTHER PUBLICATIONS

"ISO TC97/SC2/WG3N308 IRDS (Information Resource Dictionary System)-Service Interface", Revision 2, 31 Mar. 1987, pp. 27-28.

*Primary Examiner*—Gareth D. Shaw
*Assistant-Examiner*—John Q. Chavis
*Attorney, Agent, or Firm*—Fay, Sharpe, Beall, Fagan, Minnich & McKee

[57] ABSTRACT

An information life cycle management system and an information organizing method using the computer system stores information objects composed of a database and program, and a data processing device for processing an information object which is a block of the information in the storage device. Processing and execution of an information object is managed based on information life cycle states, starting with generation of the information object and ending with aborting the information object. An information accessor manager governs the available operation type and area of use of manager information based on the information life cycle state. As information object definition language defines attributes of the information structure and information life cycle state and the managed information object. The information objection is managed in accordance with contents defined by the language. An administrator of the information object with an information life cycle transform language controls the transform sequence and timing of the information life cycle state transformation for each information object. A transform of the information life cycle state is controlled in accordance with the contents defined the language. An information access unit provides an access language for using the information object and selecting and executing a proper access method based on the information life cycle state of the information object. Thus, the information is processed safely and efficiently based on the information life cycle state starting with the generation state and ending with the abort state of the information object.

37 Claims, 28 Drawing Sheets

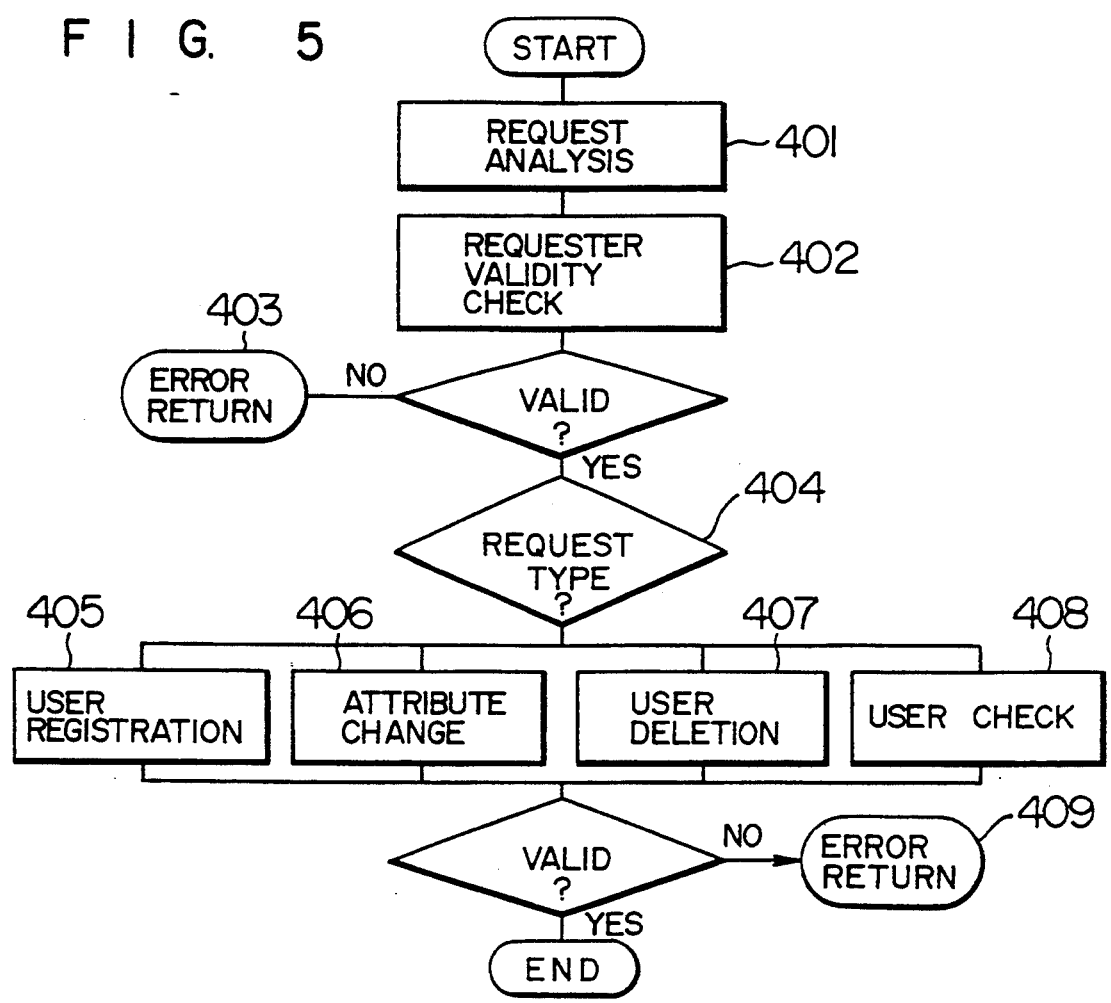

FIG. 8

| OWNER IDENTIFI- CATION NAME | OBJECT IDENTIFI- CATION NAME | LIFE CYCLE STATE | GENERATOR IDENTIFI- CATION NAME | APPROVER IDENTIFI- CATION NAME | NOTICE FLAG | HISTORY FLAG | TRANSFER CONTROL FLAG | APPROVER HIERARCHY FLAG |
|---|---|---|---|---|---|---|---|---|
| 551 | 552 | 553 | 554 | 555 | 556 | 557 | 558 | 559 |
| | | | | | | | | |
| | | | | | | | | |
| | | | | | | | | |

| OBJECT | | | PARENT OBJECT | | | CHILD OBJECT | | |
|---|---|---|---|---|---|---|---|---|
| OWNER IDENTIFI- CATION NAME | OBJECT IDENTIFI- CATION NAME | LIFE CYCLE STATE | OWNER IDENTIFI- CATION NAME | OBJECT IDENTIFI- CATION NAME | LIFE CYCLE STATE | OWNER IDENTIFI- CATION NAME | OBJECT IDENTIFI- CATION NAME | LIFE CYCLE STATE | OBJECT ARRANGE- MENT |
| 574 | 575 | 576 | 577 | 578 | 579 | 580 | 581 | 582 | 583 |

| 631 | 632 | 633 | 634 | 635 | 630 |
|---|---|---|---|---|---|
| OWNER IDENTIFI- CATION NAME | OBJECT IDENTIFI- CATION NAME | TRANSFORM ORIGINATING LIFE CYCLE STATE | TRANSFORM DESTINATION LIFE CYCLE STATE | TRANSFORM TIMING | |
| | | | | | |
| | | | | | |

FIG. 12

| 641 | 642 | 643 | 640 |
|---|---|---|---|
| OWNER IDENTIFI- CATION NAME | OBJECT IDENTIFI- CATION NAME | LIFE CYCLE STATE TRANSFORM SKIP FLAG | |
| | | · · · | |
| | | | |

FIG. 14
| OPERATOR IDENTIFI- CATION NAME | OPERATION TIME | OPERATION PLACE | OPERATION TARGET ||| OPERATION TYPE | OPERATION CONTENT ||
|---|---|---|---|---|---|---|---|---|
| | | | OBJECT IDENTIFI- CATION NAME | OWNER IDENTIFI- CATION NAME | LIFE CYCLE STATE | | OLD VALUE | NEW VALUE |
| | | | | | | | | |
| | | | | | | | | |
340
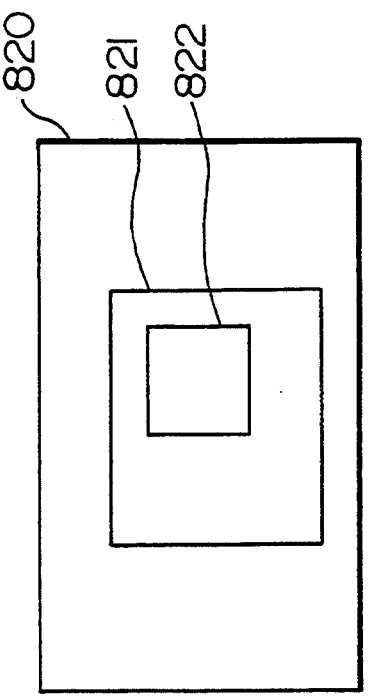
FIG. 16
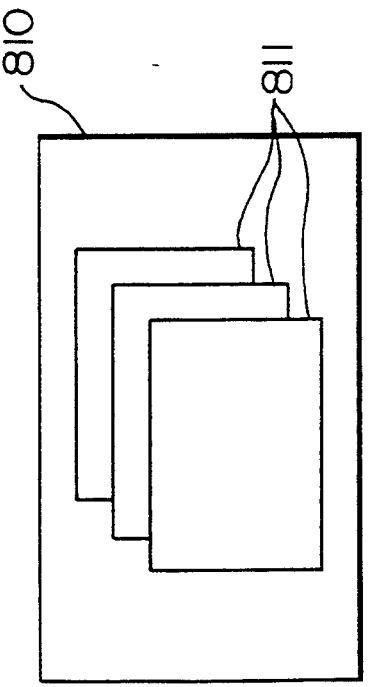
FIG. 15

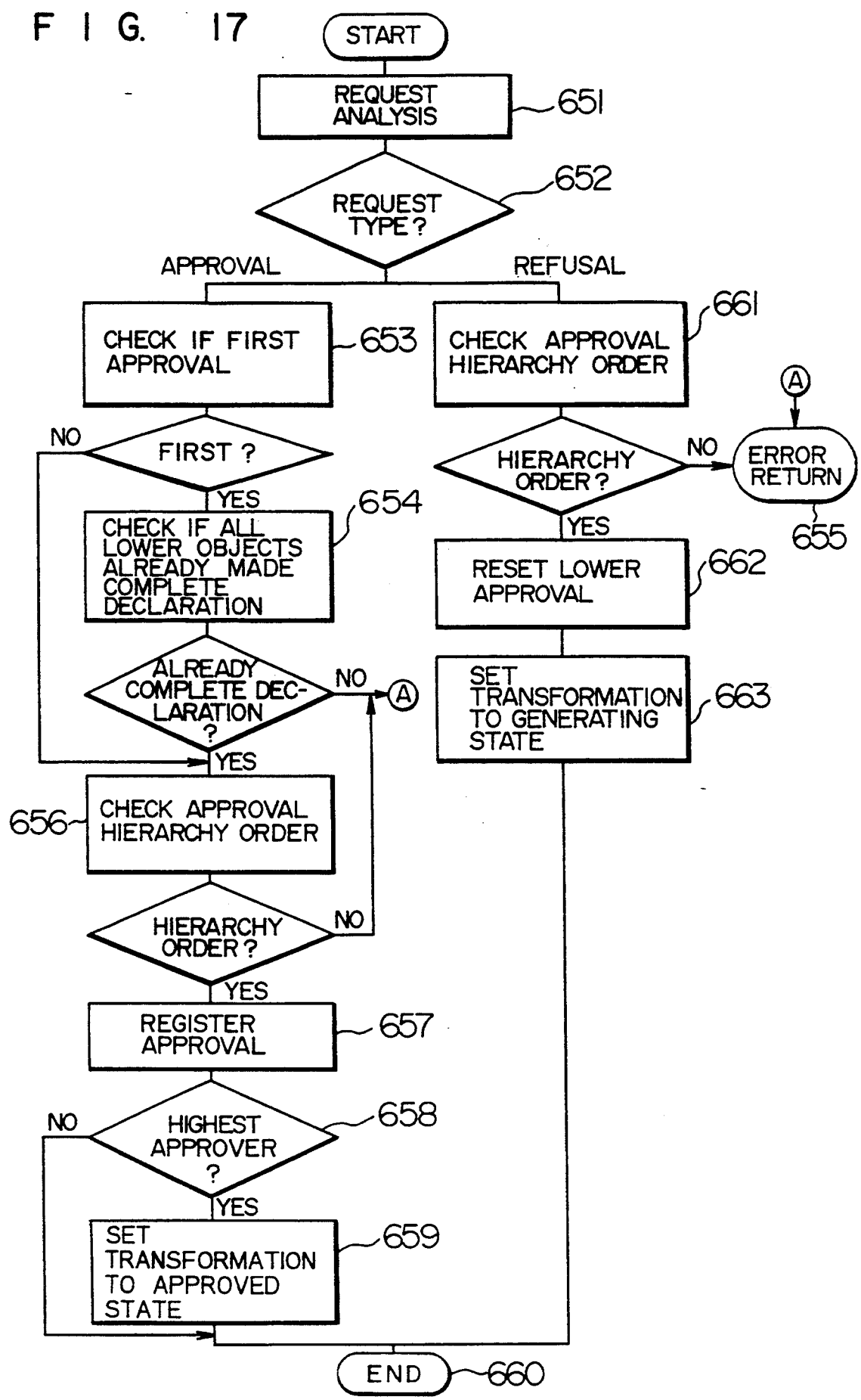

FIG. 18

| 681 | 682 | 683 HIGHEST APPROVER | | 684 LOWER APPROVER | | 685 LOWEST APPROVER | | 680 |
|---|---|---|---|---|---|---|---|---|
| OBJECT IDENTIFI- CATION NAME | OWNER IDENTIFI- CATION NAME | APPROVER IDENTIFI- CATION NAME | APPROVAL TIME | APPROVER IDENTIFI- CATION NAME | APPROVAL TIME | APPROVER IDENTIFI- CATION NAME | APPROVAL TIME | |
| | | 686 | 687 | 686 | 687 | 686 | 687 | |
| | | | | | | | | |
| | | | | | | | | |

FIG. 22

| OBJECT IDENTIFICATION NAME | OWNER IDENTIFICATION NAME | NOTICE OBJECT (1) | | NOTICE OBJECT (2) | | ... |
|---|---|---|---|---|---|---|
| | | USER IDENTIFICATION NAME | LIFE CYCLE STATE BIT | USER IDENTIFICATION NAME | LIFE CYCLE STATE BIT | |
| | | 374 | 375 | | | |

| LIFE CYCLE STATE | SITE IDENTIFICATION NAME | DATA SET IDENTIFICATION NAME |
|---|---|---|
| | | |

950, 951, 952, 953

F I G. 27
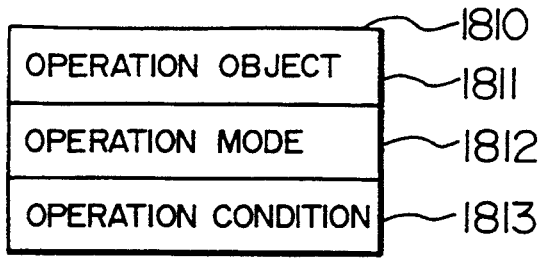
F I G. 28
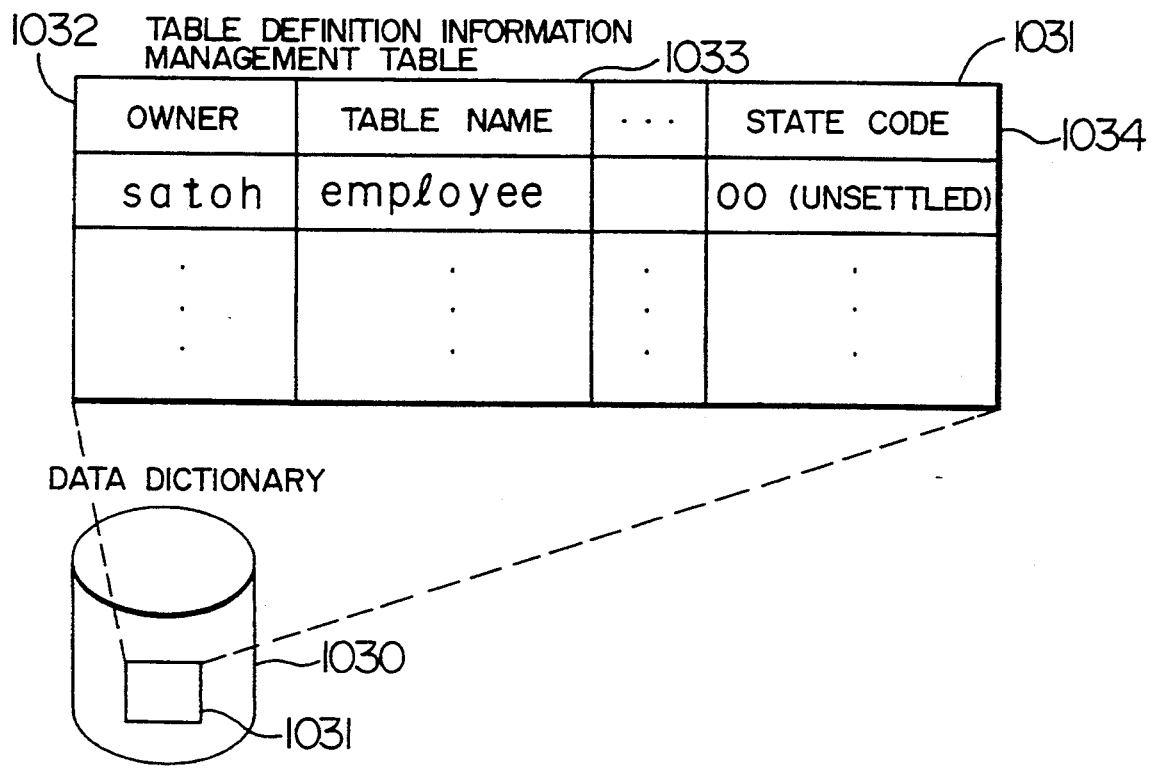
F I G. 29
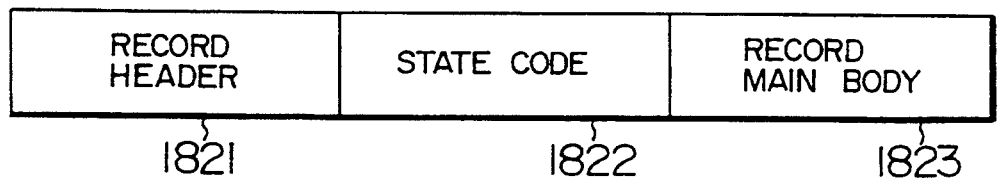

F I G. 30
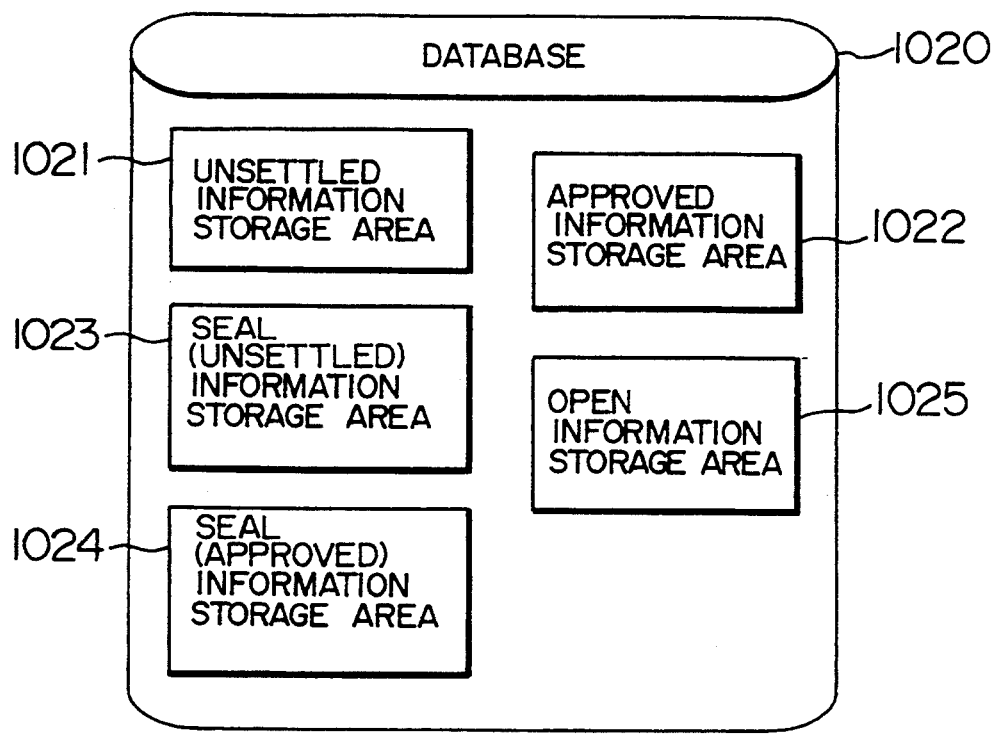
F I G. 31
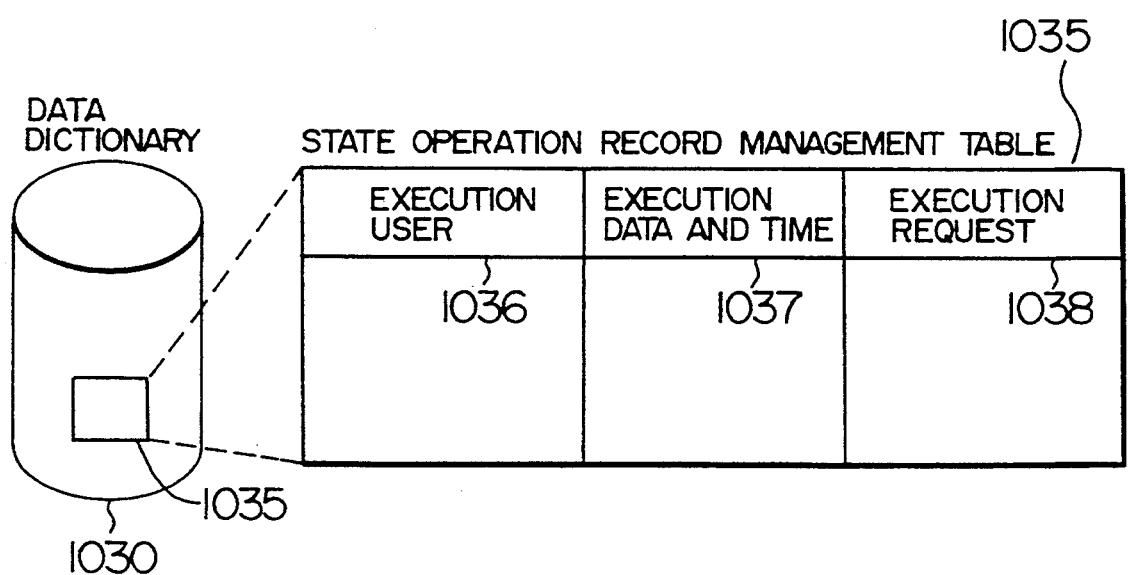

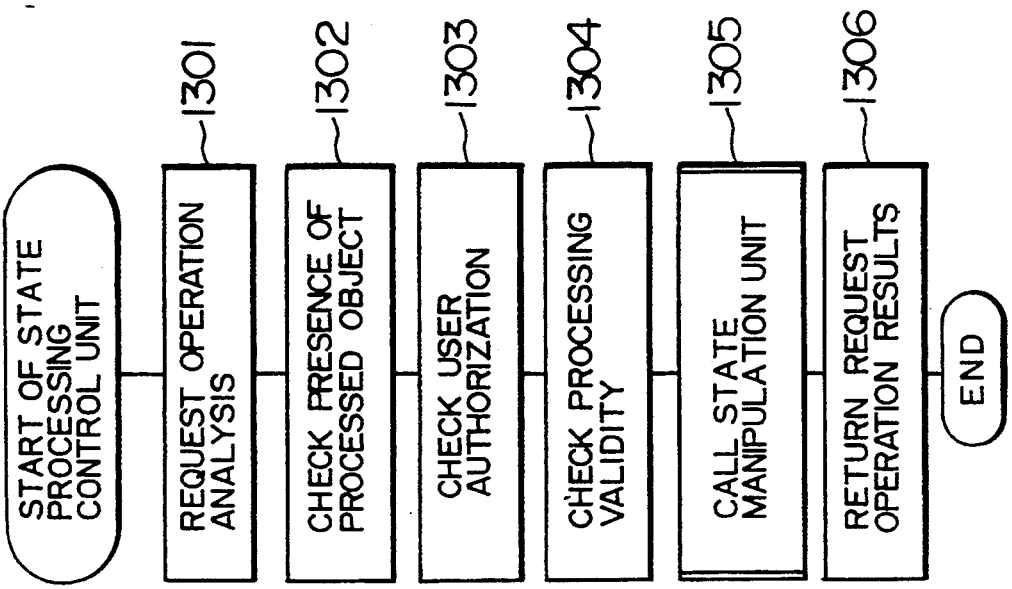
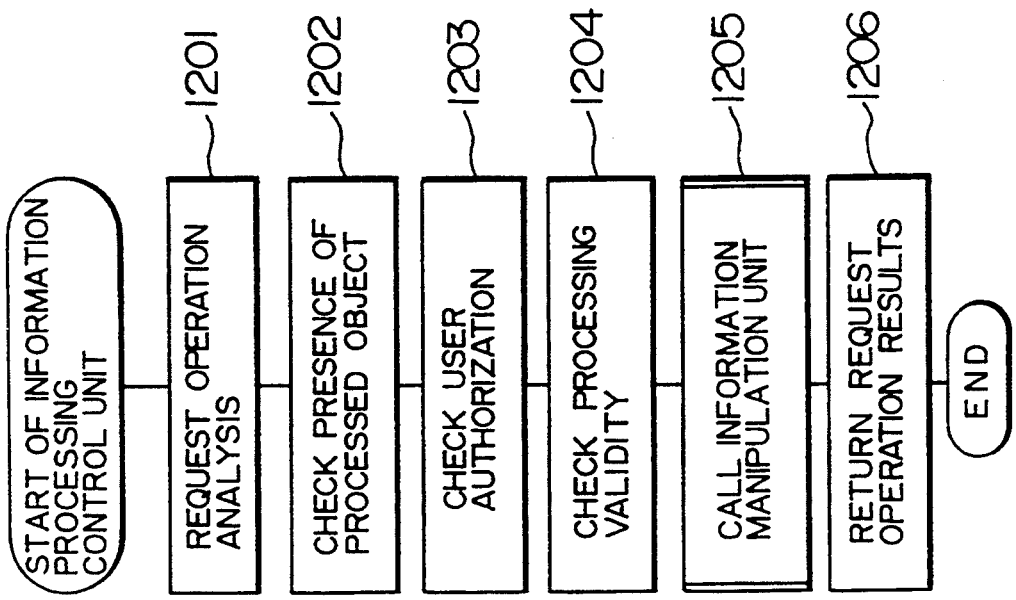

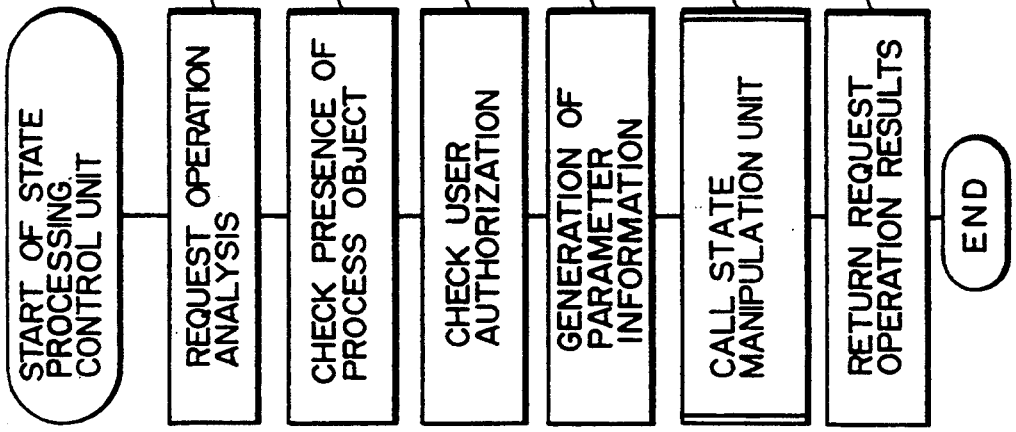
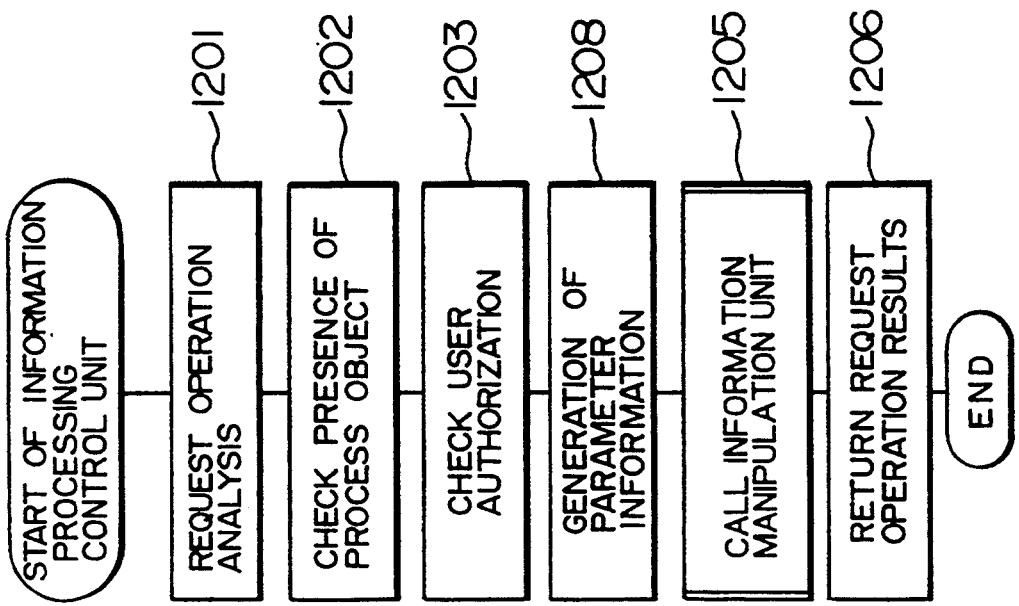

F I G. 43
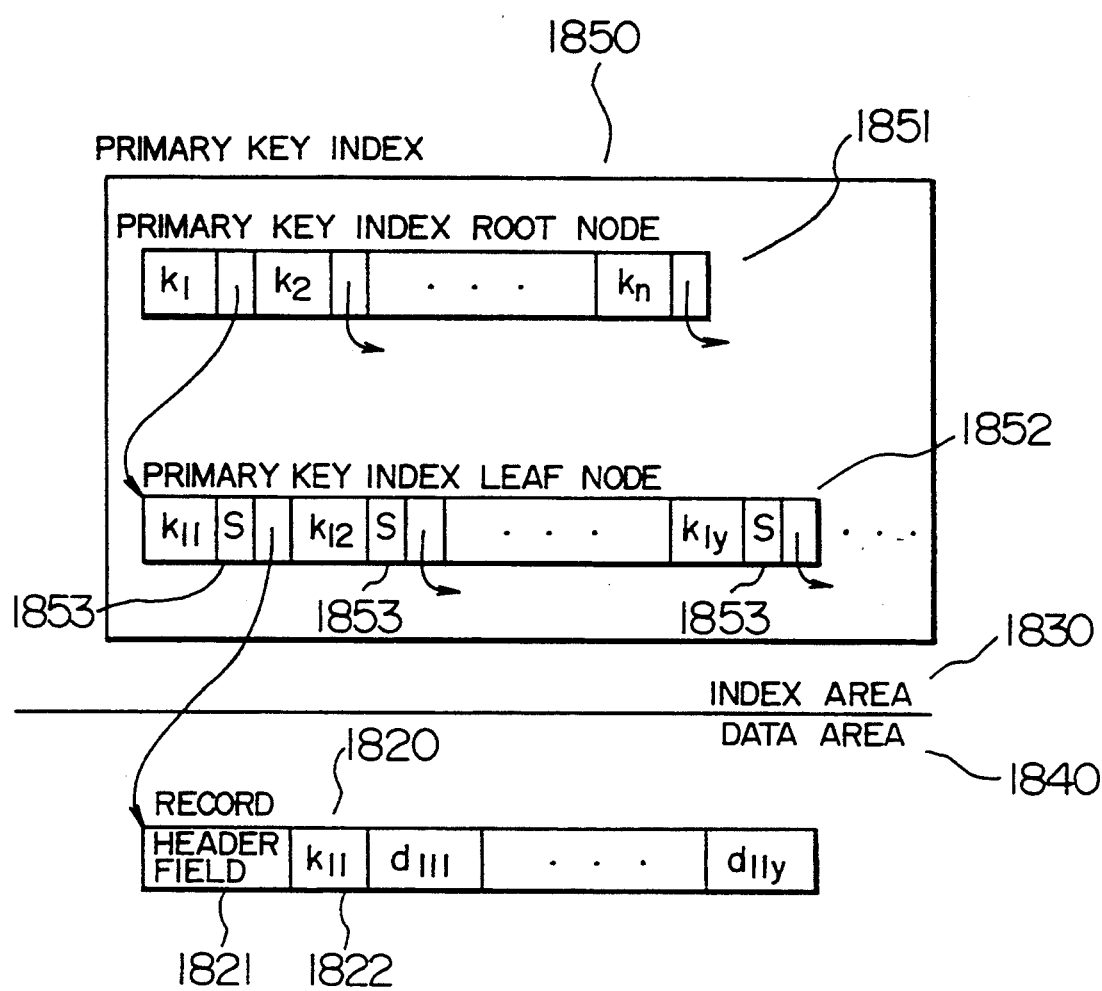

INFORMATION LIFE CYCLE PROCESSOR AND INFORMATION ORGANIZING METHOD USING IT

This is a file-wrapper continuation of abandoned application Ser. No. 07/413,313 filed on Sep. 27, 1989.

BACKGROUND OF THE INVENTION

The present invention relates to an information life cycle processor (management system) for processing information such as programs and databases, and an information organizing method using this system. More particularly, it relates to an information life cycle management system and a method using this system, suitable for processing information safely and efficiently based on the information life cycles starting with an information generating state and ending with an information aborting state.

Essentially, information has life cycles starting with an information generating state and ending with an information aborting state. Different information management functions or different information usages are needed at respective states in information life cycles.

Concerning program library management in an enterprise, for example, a program produced but still not completed for debugging and operation test is not allowed to be used. The complete program after operation test cannot be changed freely even by the programmer. After the program is approved by a proper person in the enterprise, it becomes available to the public as the enterprise's product. If any change is required thereafter for enhancing its functions or other reasons usage of this program is prohibited if necessary, and a new program with another version may be produced based on that program. Such information management has been achieved by operation rule's. As above conventional program library management software cannot discriminate each program that have different information life cycle states such as complete or incomplete. Practically, for these programs, there have been provided different operation rules such as store them in different storage areas, establish different naming rules, grant access privileges, and so on. Because of operation rules, whether they can manage programs rightly depends on the programmer's responsibility. As the amount of valuable programs increases, there occurs an increase burden of responsibility. Such as destruction of these programs caused by careless errors or program theft may cause many risks.

Also in the database management system (DBMS), for example, in "Hitachi Relational Database Management System RDB1 Manual", information stored in the database is handled in the same manner whether it is incomplete or complete. Therefore, in the same manner as of programs, data are managed based on operation rules, thereby posing similar problems. In addition, DBMS has only one processing mechanism for stored information with various life cycle states. For safety, most delicate mechanisms will be applied to whole information. Ideally, it will prefer to apply the most suitable or efficient processing mechanism to each information. For example, for incomplete information, the DBMS must provide a proper user with facilities for information updating and dealing with failures during updating. But, a delicate mechanism for information sharing facility may be not important. On the other hand, for complete information, the DBMS must provide with facilities for information reading. And it is necessary to provide efficient mechanisms for search within a great amount of information against various read requests. But, a mechanism for information updating facilities and recovery facility against failure may be considerably rough.

It is also the same for the case of managing document information in business field or drawing information in design field. At these fields, it also depends on operation rules about the information development management such as information generating, check, approval and publicizing, information distribution management for literary works with intellectual properties, e.g., restriction against copying them, and other managements.

The above-described conventional technique is not provided with information management facilities for managing information based on life cycles while it is an essential attribute. For this reason, information administrators establish information operation rule to be observed by user. But, there is only one type of processing mechanism for the information with various states of the information life cycle, and there is not provided information management facilities for literary works.

There involve the problems such as an increased burden on information management, unavailability of most proper and efficient mechanism, difficulty in safety management for literary work, and so on.

Apart from the above, as with application systems using databases and database management systems, document or drawing management systems have recently appeared.

In the real world, information, i.e., documents or drawings, becomes formal documents only after they are examined and approved. Formal documents are not usually allowed to be changed. To share these formal documents, they are kept in a public file or cabinet available to every person. Secret documents which should not be read by unauthorized person, are kept in a safe or keyed cabinet.

Conventional database systems, however, don't manage information based on information life cycle states described above. An information administrator must control the available operation for user by authorizing them to access the information. This is described in, e.g., "Investigation on Database System—Investigation on Database Security Function—" at pages 167 to 172 (59-C-480, issued in March 1984), compiled by The Japan Electronic Industry Development Association, Special Interest Group on Database.

In order to manage information on computer systems in same manner of real world, conventionally, a user must write programs by which the user can manage information based on information life cycle states, or establish operation rules on databases.

In the case of operation rules, we may use a view function supported by DBMSs. A view is a "virtual" database—i.e., database that does not directly exist in physical storage, but looks to the user as if it did. A user can define views. In a relational database, the database is constructed from a set of tables. Views are defined in terms of one or more of the underlying base tables. Also, it is possible to define a view as a fraction (vertically divided portion, and or horizontally divided portion) of base tables. When a user stores flags that indicate a life cycle state into base tables, and defines different views for each state, to a user may be able to manage information based on life cycle state by using views.

Formerly, to manage the information based on information life cycle states by using database management system, a user had to write programs or establish operation rules as above. The burden for those works is not light for user. Also, user may use an authorization mechanism provided by DBMS for access control. The user may have access priviledges for tables. In this case, the user may update all the information within that tables, so it is difficult to protect information based on information life cycle states.

In the case of using a view function, information administrators must define views for each state, and they must manage access privileges for each view. The burden for such work is also not light.

When life cycle state of an information is changed, the user must request this information by using different view. The burden for such work substantial.

SUMMARY OF THE INVENTION

It is a first object of the present invention to provide an information life cycle management system and an information organizing method suitable for processing information safely and efficiently based on the information life cycle, starting with an information generating state, and ending with an information absorting state.

It is a second object of the present invention to provide a data base organizing method capable of lightening the burden for a user (information administrator, information user) by introducing the information life cycle state management to the database management system, and of realizing the information processing functions suitable to the information management manner in the real world.

In order to achieve the first object, the present invention features in that the information management system for managing information such as programs and data bases is provided with the following means:
(1) Information life cycle management means for controlling to process each information object based on the information life cycle state.
(2) Information accessor management means for managing accessors to an information object, such as administrators (authors) or user for each information object, available operation types, and aims of use.
(3) Information object management means for providing an information object definition language in which managers define an information object structure, and keeping the information object in accordance with that structure.
(4) Information life cycle transform means for providing an information life cycle transform language in which managers control the transform of an information life cycle state, and executing a transform process.
(5) Information access means for providing an information access language, in which managers or users use an information object, selecting a proper access method based on the information life cycle state of an information object and executing it.

The above-described means operate in the information management system in the following manner:
(1) The information life cycle management means receives an information object definition request written in the information object definition language, an information life cycle state transform request written in the information life cycle transform language, and an information object access request written in the information access language, analyzes these requests, and controls to process an information object based on the information life cycles starting with an information generating state and ending with aborting state.
(2) The information accessor management means manages the manager, user, their available operation types and the like for each information object in order to the information object security at each information life cycle state, and upon reception of an information object access request, checks the validity of the requester and its operation contents based on the information life cycle states for the information object to be accessed.
(3) The information object management means manages an information object structure defined with the information object definition language and keeps each information object rightly in accordance with it's structure defined.
(4) The information life cycle transform means executes a transform processing of the life cycle state of an information object along with the defined transform sequence, upon reception of an information life cycle state transform request written in the information life cycle transform language, or based on the transform timing designated in information object definition.
(5) The information access means provides the information access language, and selects a proper access method based on the information life cycle state, and access information objects requested.

With the operations noted above, we can manage information objects based on information life cycle states safely and efficiently.

The second object of the present invention is achieved by the provision of new function in a database management system, which includes providing storage area for keeping information life cycle state, setting wherein the information life cycle state for the information object into the storage area, and processing the stored information objects based on their life cycle states.

As described above, a database management system of this invention has an information life cycle management function.

A user first stores information objects into the database. The information stored is in incomplete state until approval. The information with incomplete state can be read or updated only by those users authorized by the information administrator. If the information with incomplete state is approved by the information administrator, then the information has an approved state wherein it can be read only, but not updated, by those users authorized by the information administrator.

If the information administrator makes open the information with the approved state, then the information has an open state wherein it can be read by any user but not updated. The information with the open state can be read by any user so long as the user has been authorized to the system even if he does not have read privilege. The information with the open state is transformed into the approved state again by close operation. A seal operation makes the information with the incomplete state or the approved state into a seal state wherein the information can be read by any user but not be updated. On the contrary, an unseal operation makes the information with the seal state into the incomplete or approved state again.

When user with read priviledge request to read information, the DBMS presents the information if the information is in the-open state, or in the incomplete or approved state. When user with update privilege request to update information, the DBMS updates the information if, and only if, the information is in the incomplete state.

Only the information administrator can process requests for approval, open/close, and seal/unseal. The approval request is directed only to the information with the incomplete state. The open request is directed only to the information with the approved state. The close request is directed only to the information with the open state. The seal request is directed only to the information with the approved or incomplete state. The unseal request is directed only to the information in a sealed state.

The information administrator can execute all operations and state transform operations for the information in database. Other users can execute operations when they are granted access priviledges by the information administrator.

BRIEF DESCRIPTION OF THE DRAWINGS

FIG. 5 is a flow chart showing the processes executed by the information accessor management facility;

FIG. 6 illustrates dictionary table schema used by information accessor management;

FIG. 8 illustrates dictionary table schema for information object definition;

FIG. 9 illustrates dictionary table schema for information object hierarchy management;

FIG. 11 illustrates dictionary table schema for information life cycle transform control;

FIG. 12 illustrates dictionary table schema for information life cycle state transform sequence;

FIG. 14 shows an example of operation history data;

FIGS. 15 and 16 show examples of displays on a terminal presented by the information life cycle state presentation facility;

FIG. 17 is a flow chart showing the processes executed by the approval hierarchy control facility;

FIG. 18 shows dictionary table schema for approval hierarchy management;

FIG. 22 illustrates notice control information schema used by the notice facility;

FIG. 23 shows an example of storage management control infromation schema used by the storage management facility;

FIG. 27 shows an example of interface parameters which is passed from the state processing control unit to the state manipulating unit;

FIG. 28 shows an example of a dictionary table schema for table definition;

FIG. 29 shows an example of a record format having the state identifier;

FIG. 30 shows an example of storage partitions for keeping the information with different life cycle state;

FIG. 31 shows an example of the format of the state operation history table;

FIGS. 33 to 38 are flow charts illustrating the operation of an embodiment of the database management system of this invention;

FIGS. 39 to 42 are flow charts illustrating the operation of another embodiment of the database management system of this invention;

FIG. 43 shows an example of the structure of the primary key index; and

DETAILED DESCRIPTION OF THE PREFERRED EMBODIMENTS

An embodiment of the information life cycle processor according to the present invention will be described below.

Figure 1:
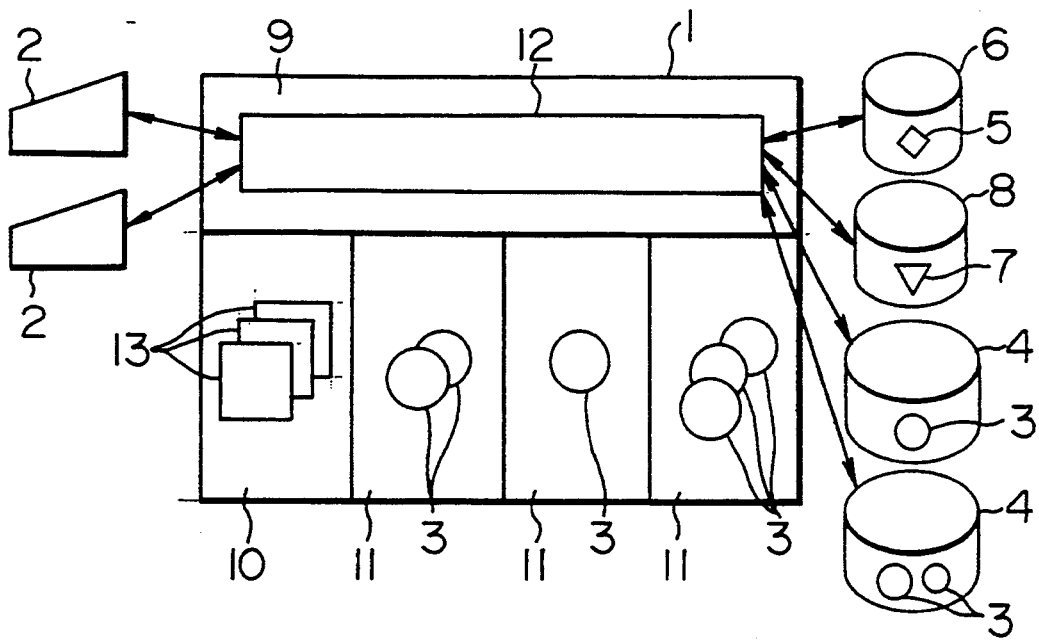
FIG. 1 is a block diagram showing the system arrangement of an embodiment of the information life cycle management system according to the present invention.

An example of the system arrangement of the information life cycle management system of this invention is shown in FIG. 1.

The information life cycle management system is constructed of an information processor (1) for processing infromation objects; one or more terminals (2) from which a user issues an information object processing request; one or more storage devices (4) for storing a set of information objects (3) based on its information life cycle state; one or more storage devices (6) for keeping dictionary (5) that includes management information about users, information objects, their information life cycle states, and the like; and one or more storage devices (8) for storing a user operation history (7). The information object means a meaningful block (one unit) of information such as texts as viewed from a user.

The information processor (1) has one system space (9), one or more application program spaces (10), and one or more data processing spaces (11).

There are provided, in the system space (9), information management program (12) for managing information based on the information life cycle state. In the application program space (10), application programs (13) can be executed for issuing an information object operation request. In each data processing space (11), information objects (3) can be processed for each information life cycle state.

Upon an information object operation request by a user from the terminal (2) or from the application program (13), the information management program (12)

operates in the following manner. Namely, the information management program(12) checks the validity of the request by referencing dictionary (5). If valid, the data processing space (11) is selected in accordance with the information life cycle state of the information (3) to be operated. The information object (3) is then processed in the selected space. The information management program (12) then sends the processed results back to the terminal (2) or application program (13). The information management program (12) may store this operation history (7) in the storage device (8).

Figure 2:
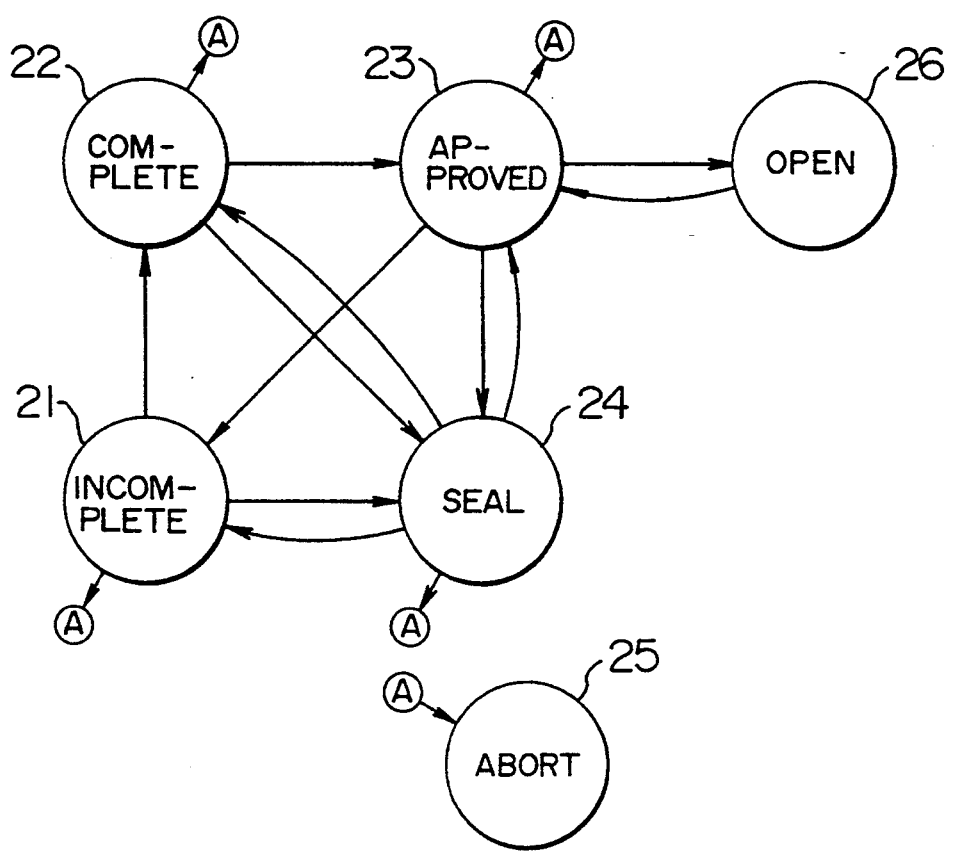
FIG. 2 is a diagram showing the information life cycle state transition.

An example of the information life cycle state and its transition of the information object (3) is shown in FIG. 2. As the information life cycle state, the following states are considered:

(a) An incomplete state (21) where information is not completed and is being generated.

(b) A complete state (22) where the information has been completed but the contents thereof are not still approved.

(c) An approved state (23) where the information has been approved but the use thereof is not still allowed.

(d) An open state (26) where the use of the information has been allowed.

(e) A seal state (24) where an access other than by the owner is prohibited.

(f) An abort state (25) where the information object was deleted.

The incomplete state (21) is the initial state of the information object (3). When the information object (3) is completed by the information generator, the state moves to the complete state (22). The information object (3) with the complete state (22) enters into the approved state when it is approved by the manager of information generating department. The information object (3) with the approved state (23) may enter into the open state (26) when it needs to be used by every user. The information object (3) with the open state (26) may move into the approved state (23) upon a close operation where it is prohibited to be used by any user. There is a possibility that the information object (3) moves into the incomplete state (21) from the complete state (22) or approved state (23) in the course of the approval process. The information object (3) in the incomplete, complete or approved state (23) may move to the seal state (24) where the information object (3) is prohibited to be used. The information object (3) in each of the states finally moves to the abort state (25) where the information object is deleted to terminate the information life cycle.

Figure 3:
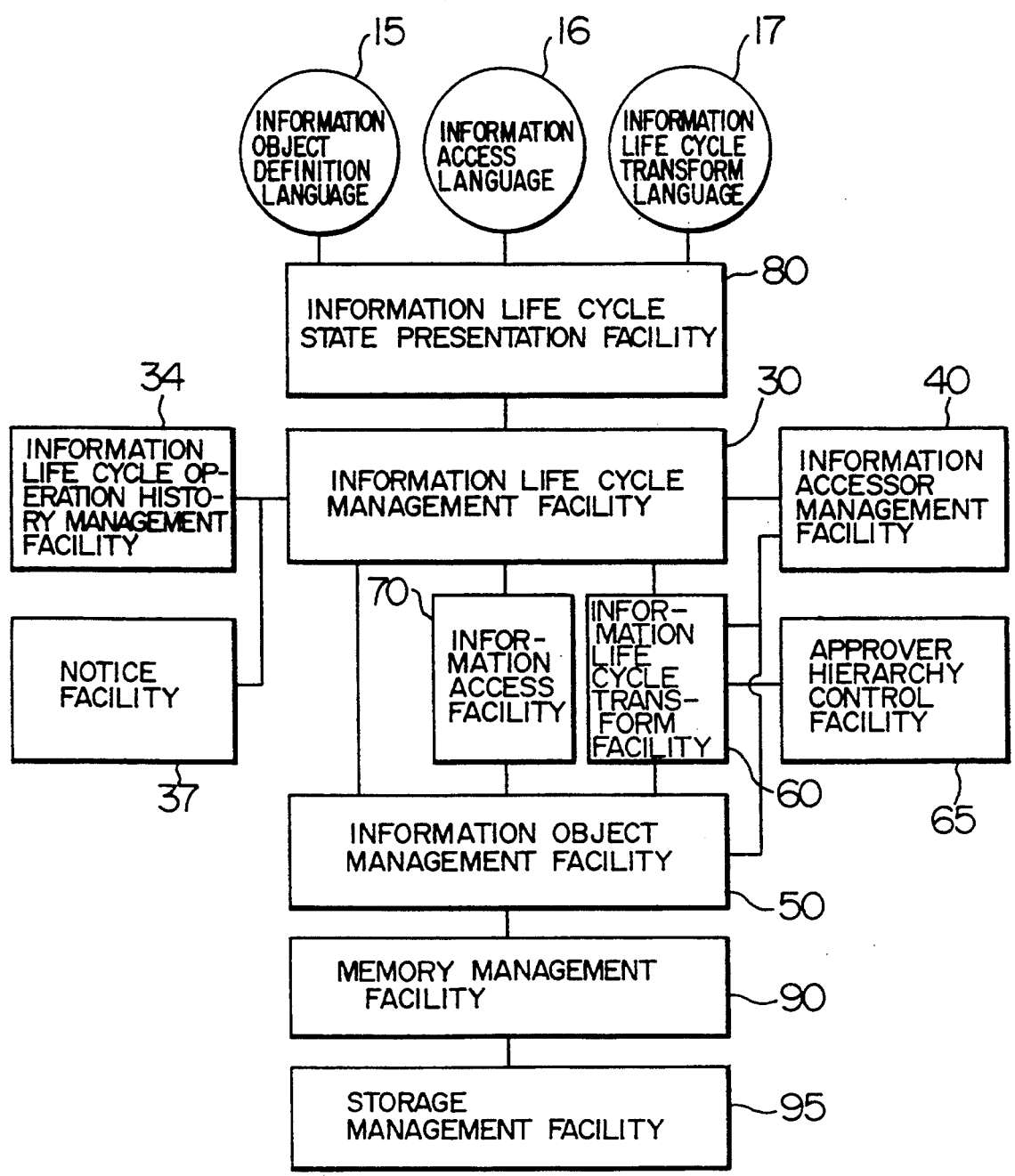
FIG. 3 shows the functional structure of the information management program.

The functional arrangement of the information management program (12) is shown in FIG. 3.

A. The information life cycle management facility (30) controls to process the information object (3) in accordance with its information life cycle state such as the incomplete state (21), complete state (22), approved state (23), open state (26), seal state (24) and abort state (25).

B. The information accessor management facility (40) manages the accessors to the information object (3) by using the dictionary (5), the accessors including:

(a) an owner (author) of an information object managed by the information processor (1);

(b) a generator empowered to generate an information object (3) by the owner;

(c) an approve empowered to approve the contents of the information object (3) by the owner;

(d) an user allowed to use the information object (3) by the owner; and other persons. The owner of the information object (3) can choose an approver, generator, and user, and grant the access priviledges for the information object (3) such as reading, updating, copying and moving, and the aims of use allowed for the information object (3).

C. The information object management facility (50) provides the owner with an information object definition language (15) which defines the attributes of the information object (3), the attributes including:

(a) the structure of an information object;

(b) the hierarchical relationships with other information objects, such as each volume within complete works;

(c) the name of an owner;

(d) the name of an approver;

(e) the name of a generator;

(f) the name of a user; and access priviledges to the persons (c) to (f). The information object management facility (50) manages by using the dictionary (5) the information object (3) as to its location in the information object hierarchical relationship, its information life cycle state, its information object identifier, and the like.

D. The information life cycle transform facility (60) provides an information life cycle transform language (17) by which the following items can be designated, immediately executed or registered for executing later:

(a) transform operation types;

(b) a condition specifying information objects to be transformed;

(c) the information life cycle state of information objects;

(d) transform timings;

(e) transform sequence; and the like in order to control the information life cycle state transform of the information object (3) requested by the owner, approver or generator, and process the request based on the information life cycle transform sequence.

The information life cycle transform operations to be allowed include:

(a) a completion declaration operation for transforming the information object with the incomplete state (21) to the complete state (22);

(b) an approval operation for transforming the information object with the complete state (22) to the approved state (23);

(c) a refusal operation for returning the information object with the complete state (22) back to the incomplete state (21);

(d) an open operation for transforming the information object with the approved state (23) to the open state (26);

(e) a close operation for returning the information object with the open state (26) back to the approved state (23);

(f) a seal operation for transferring to the seal state (24); and (g) an abort operation for transferring to the abort state (25).

The information life cycle transform facility (60) allows:

① the information object with the incomplete state (21) to be subjected to the completion declaration operation by a generator and the seal and abort operations by an owner;

② the information object with the complete state (22) to be subjected to the approval operation or refusal operation by an approver and the seal and abort operations by an owner;

(3) the information object with the approved state (23) to be subjected to the open, refusal, seal and abort operations by an owner;

(4) the information object with the open state (26) to be subjected to the close operation by an owner; and (5) the information object in the seal state (24) to be subjected to the unseal and abort operations by an owner.

The transfer timings may be set beforehand by the owner, approver and generator to an absolute time such as a date when the information life cycle state is to be transformed, to a relative time such as after several days, or to another event. The information life cycle transform facility (60) checks the validity of the sequence of the flow of the information life cycle as much as possible, and if the flow is valid then the request is processed. If the validity of the flow cannot be estimated then, it is checked later such as the time of a transform timing, and if valid, the transform request is processed.

In the transform sequence definition, the owner of an information object (3) may omit a transformation into a particular information life cycle state, or direct a variety of transform sequence. The information life cycle transform facility (60) executes the state transformation upon reception of a transform request, in accordance with its transform sequence. Even if the owner of an information object (3) has previously registered a standard information life cycle transform sequence, if a state transform request written by the information life cycle transform language (17) is issued to the information object (3), this request can be executed with priority. When the "child" information objects (3) under a certain information object (3) in the information object hierarchy have the same life cycle state, this "parent" information object (3) is also transformed into this life cycle state, or when a transformation of the life cycle state of an information object (3) is requested, the "child" information objects (3) of the information object (3) are transformed into the same life cycle state if it can.

E. The information access facility (70) provides an information access language (16) which can execute the following accesses, upon request from an authorized user:

reading an information object;
updating an information object;
making a copy;
moving for charging the owner; and
the like; allow an access to an information object (3) in the information object hierarchy to result in accessing the "child" information objects (3) under that information object (3), and allow to collectively access the information objects (3) having different information life cycle states. The information access facility (70) selects a proper access method suitable for the information object to be processed, based on its information life cycle state.

For example, the information access facility (70) allows:

(a) the information object with the incomplete state (21) to be subjected to the reading and updating operations in exclusive mode by the generator, owner or approver;

(b) the information object with the complete state (22) to be subjected to the reading, copying and moving operations in exclusive mode by the owner and approver;

(c) the information object with the approved state (23) to be subjected to the reading, copying and moving operations in exclusive mode by the owner;

(d) the information object with the open state (26) to be subjected to the reading operation in share mode by the users; and does not allow (e) the information object with the seal state (24) to be directly operated, i.e., it requires unseal operation.

F. The information life cycle operation history management facility (34) records an operation history (7) regarding an information life cycle state transform operation carried out for an information object (3) or an information access operation in each information life cycle state. When a system failure occurs during executing jobs, the operation contents done by the job are aborted by using the operation history (7). The operation history (7) is also provided for analyzing the operation contents or for giving a user the operation status reports.

G. The information life cycle state presentation facility (80) presents a user with the identifier for discriminating between the information life cycle states of an information objects (3), and also, displays an information objects (3) in different manner for each information life cycle state on a display terminal screen. For example, it displays as below; with different color, different brightness, or different position for each information life cycle state in order to discriminate between the information life cycle state of the information objects (3) visually; at stepwise timings for each information life cycle state; with different character pattern and size; with information explicitly indicating an information life cycle state; with different cursor designation; or with other means.

H. The approval hierarchy control facility (65) allows the owner, if there is an approver hierarchy with one or more approvers for an information object (3), to define an approval hierarchy structure with one or more levels of hierarchy and the information approvers for each level. An information approver at a higher level in the approval hierarchy is allowed to carry out an approval operation only after all information approvers at a lower level has approved an information object. When an approver at the highest level approver carried out the approval operation, the information object (3) is moved to the approved state (23). When an approver rejects to approve the information object, an approver at the one level higher than that of the approver approving the information object (3) lately is allowed to refusal operation, to thereby make invalid the approval operation and move the information object (3) back to the incomplete state (21).

I. The memory space management facility (90) provides one or more data processing spaces (11) shown in the following, in accordance with the information life cycle state of an information object (3):

(a) A generating space wherein the information object with the incomplete state (21) is processed. A single user, e.g., a generator, at a time, is allowed to perform reading, updating or completion declaration operation for an information object. In this space, it is necessary to have the ability to deal with various failures in the system, such as abnormal power supply, e.g., non-volatile nature.

(b) A completing/approving space wherein the information object with the complete/approved state is processed. A single user, e.g., an approver, at a time, is allowed to perform read, approval or refusal operation for an information object, or e.g., an owner is allowed to perform read, open, moving or seal operation. In this space, it is necessary to have a high ability for information object security.

(c) An opening space wherein the information object with the open state (26) is processed. Users are allowed to perform read or copy operation or the owner to perform a close operation. In this space; it is necessary to have an ability to reject update operation.

(d) A sealing space wherein the information with the seal state (24) is processed. Only the owner is allowed to perform the abort or unseal operation. The information objects within this space cannot be directly used.

The memory space management facility (90) dynamically determines the data processing space (11) for the information objects (3) to be processed based on the information life cycle states.

Since different processing spaces are provided for each information life cycle state, it becomes necessary to move the information object (3) into other space when the information life cycle state changes. However, in this case, the processing within each space can be done more efficiently, and the information objects (3) at different information life cycles can be processed in parallel within these spaces.

J. The notice facility (37) informs the owner or approver of the changes of the-information life cycle state of each information object (3) or a predetermined information objects (3).

K. The storage management facility (95) stores information objects (3) in proper storage devices based on the information life cycle states. It includes methods for storing information objects as below:

(a) a method of storing information objects in different storage devices for each information life cycle state such as a magnetic disk unit;

(b) a method of storing information object in different files for each information life cycle state;

(c) a method of storing information objects in different set of records within files for each of information life cycle state;

(d) a method of storing information objects in different set of columns within files for each information life cycle state; and (e) a method of storing information objects in different computer groups constructed from large computers and/or small computers such as work stations and personal computers, and interconnected via communication networks, for each information life cycle state.

The flow of the information object processing will be described for each processing phase.

(a) When Defining Information Object

The owner authorized by a system manager and registered for the information accessor management facility (40) issues an information object definition request to the information life cycle management facility (30) via an interface provided by the information life cycle state presentation facility (80). The information life cycle management facility (30) checks the validity of the owner by using the information accessor management facility (40). If valid, the information life cycle management facility (30) presents the owner with an information object list of the owner. While referring to this presented information and using the information object definition language (15), the owner can define the information object to be generated, such as the information object identifier, information object hierarchical structure, generator, approver hierarchy, users and their access priviledges. The information life cycle management facility (30) issues an information object definition request to the information life cycle transform facility (60). The information life cycle transform facility (60) request the information object management facility (50) for the registration of definition contents for the information object. The information object management facility (50) asks the information accessor management facility (40) for the validity check of the owner, generator, approver and user for the information object. If valid, the information object management facility (50) registers the information object definition contents. At this definition, the owner may define the information life cycle transform sequence and transformation notice method for the information object. The information life cycle management facility (30) obtains the operation history (7) of the state transition by using the information life cycle operation history management facility (30), and if necessary, notifies its transformation to the user by means of the notice facility (37).

(b) When Generating Information Object

The generator issues an information object generation request to the information life cycle management facility (30) via an interface provided by the information life cycle state presentation facility (80). The information life cycle management facility (30) asks for the information accessor management facility (40) for the validity check of the generator. If valid, the information life cycle management facility (30) asks the information access facility (70) for the preparation for generating the information object. The information access facility (70) issues an updating request for the information object to the information object management facility (50). The information object management facility (50) asks the memory space management facility (90) for the preparation of the data processing space (11) within which the information object is generated. The generator uses the information access language (16) to generate the information object within the generating space. The information access facility (70) can record the change history (7) of the information object. The memory space management facility (90) asks the storage management facility (95) for the storage of the generating information object in the storage devices (4) at a proper timing the generator designates or at the time of completion of the system operation. When the generator issues a completion declaration by using the information life cycle transform language (17) at the time when the information object has completely generated, the information life cycle management facility (30) passes the control to the information life cycle transform facility (60). The information life cycle transform facility (60) checks the life cycle state of the information object to confirm the integrity with the defined transform sequence. If the state transformation is valid, the life cycle transform facility (60) obtains the information object hierarchical structure information from the information object management facility (50) to confirm the transform validity. The memory space management facility (90) moves the information object and associated information objects within the generating space to the complete/approval space. The storage management facility (95) moves the information objects to the storage area of the complete/approval information. The information life cycle management facility (30) requests to be recorded the history (7) of the state transition by the information life cycle operation history management facility (34), and if necessary, notifies it to the user by means of the notice facility (37).

(c) When Approving

The approver issues an information object approval request to the information life cycle management facility (30) via an interface presented by the information life cycle state presentation facility (80). The information life cycle management facility (30) performs the validity check of the approver by means of the information life cycle management facility (40). If valid, the information life cycle management facility (30) presents the approver with a list of information objects to be approved by the approver. When the approver selects the information object, the information life cycle management facility (30) passes the control to the information life cycle transform facility (60). The infromation life cycle transform facility (60) obtains the information object hierarchy structure information from the information object management facility (50) to check the validity of the approval operation for the information object, and confirms the integrity with the registered transform sequence. If the state transformation is valid, the information life cycle transform facility (60) issues a request to read the information objects to the information access facility (70). The information access facility (70) asks the memory space management facility (90) for reading the information objects via the information object management facility (50). The memory space management facility (90) prepares the data processing space (11) for the information objects, and causes the information objects to be read in the data processing space (11) via the storage management facility (95). When the approver confirms the information object contents by means of the information life cycle state presentation facility (80) and requests to execute an approval operation, the information life cycle management facility (30) passes the control to the information life cycle transform facility (60). The information life cycle transform facility (60) confirms by using the approval hierarchy control facility (65) if the approver is the highest approver within the approver hierarchy. If highest, the information life cycle transform facility (60) informs the information object management facility (50) of the approved state (23) of the information object. The information life cycle management facility (30) requests to be recorded the history of the state transition by the information life cycle operation history management facility (34), and if necessary, notifies it to the user by means of the notice facility (37).

(d) When Making Open

When the owner makes the information object open to use, the owner issues an information object open request to the information life cycle management facility (30) via an interface presented by the information life cycle state presentation facility (80). The information life cycle management facility (30) asks the information accessor management facility (40) for the validity check of the owner. If valid, the information life cycle management facility (30) presents the owner with a list of information objects to be opened by the owner. When the owner chooses the infromation object, the information life cycle management facility (30) passes the control to the infromation life cycle transform facility (60). The information life cycle transform facility (60) checks the life cycle state of the information object to confirm if the life cycle state has integrity with the defined transform sequence. If valid, the information object hierarchy structure information is obtained from the information object management facility (50) to confirm the transfer validity. If it is a valid transformation of state, the information life cycle transform facility (60) issues a request to read the information objects to the information access facility (70). The information access facility (70) asks the memory space management facility (90) for reading the information objects via the information object management facility (50). The memory space management facility (90) prepares the data processing space (11) for the information objects, and reads the information objects into the data processing space (11) via the storage management facility (95). The owner confirms the contents of the information object via the information life cycle state presentation facility (80) and requests to execute an open operation. Then, the information life cycle management facility (30) passes the control to the information life cycle transform facility (60). The information life cycle transform facility (60) notifies the information object management facility (50) of the open state (26) of the information object. The memory space management facility (90) to which the control has been passed from the information object management facility (50) moves the information object and associated information objects within the complete/approved space to the open space. The storage management facility (95) moves the information objects to the storage area of the open information. The information life cycle management facility (30) request to be recorded the history (7) of the state transformation by the information life cycle operation history management facility (34), and if necessary, notifies it to the user via the notice facility (37).

(e) When Making Close

When the opened information object is to be changed, it becomes necessary to perform a close operation in order to stop the use of the information object. The information object returned to the approved state (23) by the close operation may be copied or returned back to the incomplete state moreover. First case, this copy becomes in incomplete state (21), and it may be modified and opened as a new version. Second case, the information object with incomplete state may be modified and opened again. The owner issues an information object close request to the information life cycle management facility (30) via an interface presented by the information life cycle state presentation facility (80). The information life cycle management facility (30) checks the validity of the owner by means of the information accessor management facility (40). If valid, the information life cycle management facility (30) presents the owner with a list of information objects of the owner in the open state (26). When the owner chooses the information object, the information life cycle management facility (30) passes the control to the information life cycle transform facility (60). The information life cycle transform facility (60) checks the life cycle state of the information object to confirm if the life cycle has integrity with the defined transform sequence. If the transformation is valid, the information life cycle transform facility (60) obtains the information object hierarchy structure information from the information object management facility (50), and issues a request to read the information objects to the information access facility (70). The information access facility (70) asks the memory space management facility (90) for reading the information objects via the information object management facility (50). The memory space management facility (90) prepares the data processing space (11) for the information objects, and reads the information objects into the data processing space (1i) via the storage management facility (95). When the owner confirms the contents of the information objects by means of the information life cycle state presentation facility (80) and requests to execute a close operation, the information life cycle transform facility (60) notifies the infromation object management facility (50) of the state transformation of the information object, along with the defined transform sequence for the information object. The memory space management facility (90) to which the control has been passed from the information object management facility (50) moves the information object and associated information objects within the open space, into a proper data processing space (11). The storage management facility (95) moves the information objects to its storage area. The information life cycle management facility (30) requests to be recorded the history (7) of the state transformation by means of the information life cycle operation history management facility (34), and if necessary, notifies it to the user via the notice facility (37).

(f) When Sealing

The information object which should be retained but prohibited to be accessed, can be sealed upon a seal operation. The owner issues a seal request to the information life cycle management facility (30) via an interface presented by the information life cycle state presentation facility (80). The life cycle management facility (30) checks the validity of the owner by means of the information accessor management facility (40). If valid, the information life cycle management facility (30) presents the owner with a list of information objects of the owner. When the owner chooses the information object, the information object management facility (30) passes the control to the information life cycle transform facility (60). The information life cycle transform facility (60) checks the life cycle state of the information object to confirm if the life cycle has integrity with the defined transform sequence. If the transformation is valid, the information life cycle transform facility (60) obtains the information object hierarchy structure information from the information object management facility (50), and issues a request to read the information objects to the information access facility (70). The information access facility (70) asks the memory space management facility (90) for reading the information objects via the information object management facility (50). The memory space management facility (90) prepares the data processing space (11) for the information objects, and reads the information objects into the data processing space (11) via the storage management facility (95). When the owner confirms the contents of the information objects by means of the information life cycle state presentation facility (80) and requests to execute a seal operation, the information life cycle transform facility (60) notifies the information object management facility (50) of the seal state (24) of the information object. The memory space management facility (90) to which the control has been passed from the information object management facility (50) moves the information object and associated information objects within the open space, into the seal space. The storage management facility (95) moves the information objects to the storage area for the sealed information. The information life cycle management facility (30) requests to be recorded the history (7) of the state transformation by means of the information life cycle operation history management facility (34), and if necessary, notifies it to the user via the notice facility (37).

(g) When Aborting

The owner issues an information object abort request to the information life cycle management facility (30) via an interface presented by the information life cycle state presentation facility (80). The life cycle management facility (30) checks the validity of the owner by means of the information accessor management facility (40). If valid, the information life cycle management facility (30) presents the owner with a list of information objects of the owner. When the owner chooses the information object, the information object management facility (30) passes the control to the information life cycle transform facility (60). The information life cycle transform facility (60) checks the life cycle state of the information object to confirm if the life cycle has integrity with the defined transform sequence. If the transformation is valid, the information life cycle transform facility (60) obtains the information object hierarchy structure information from the information object management facility (50), and issues a request to read the information objects to the information access facility (70). The information access facility (70) asks the memory space management facility (90) for reading the information objects via the information object management facility (50). The memory space management facility (90) prepares the data processing space (11) for the information objects, and reads the information objects into the data processing space (11) via the storage management facility (95). When the owner confirms the contents of the information objects by means of the information life cycle state presentation facility (80) and requests to execute an abort operation, the information life cycle transform facility (60) notifies the information object management facility (50) of the abort state (25) of the information object. The memory space management facility (90) to which the control has been passed from the information object management facility (50) deletes the information object and associated information objects within the space. The storage management facility (95) also deletes the information objects. The information life cycle management facility (30) requests to be recorded the history (7) of the state transformation by means of the information life cycle operation history management facility (34), and if necessary, notifies it to the user via the notice facility (37).

(h) When Using Information

The users are selectively authorized by the owner as to the use of an information object, such as reading, updating, copying and moving. The user issues an information object operation request by using the information access language (16) to the information life cycle management facility (30) via the interface presented by the information life cycle state presentation facility (80). The life cycle management facility (30) checks the validity of the user by means of the information accessor management facility (40). If valid, the information life cycle management facility (30) presents the user with a list of information objects. When the user chooses the information object, the information object management facility (30) passes the control to the information access facility (70). The information access facility (70) obtains the information object hierarchy structure information from the information object management facility (50), to thereby request the information objects to the memory space management facility (90). The memory space management facility (90) prepares the data processing space (11) for the information objects, and reads the information objects into the data processing space (11) via the storage management facility (95). The user can use the information object by means of the information access facility (70) without paying attention to the data processing space (11) having the information object.

Conditions for identifying the information object to be used, may include an information object identification name, information life cycle state identifier, information keywords and the like.

The user can also obtain the definition contents of the information objects from the information object management facility (50) by using the information access language (60).

Next, the outline of the processes executed by each facility will be given.

(A) Information Life Cycle Management Facility (30)

Figure 4:
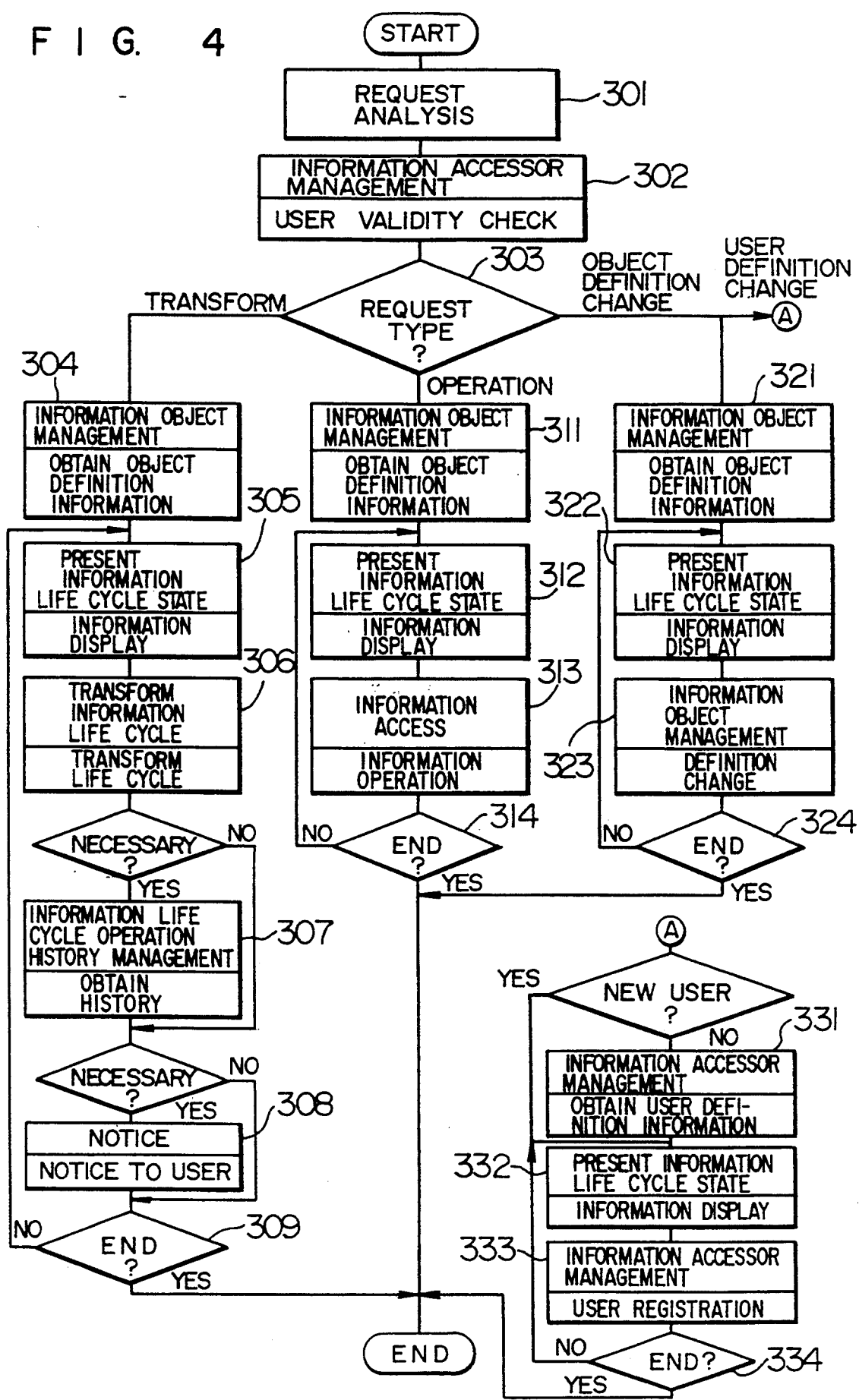
FIG. 4 is a flow chart showing the processes executed by the information life cycle management facility.

The process flow of the information life cycle management facility (30) is shown in FIG. 4. The information life cycle management facility (30) analyzes (process 301) a request received from the interface presented by the information life cycle state presentation facility (80), and asks the information accessor management facility (40) to check (process 302) the validity of the user issuing the request. If invalid, the flow returns because of an error. If valid, the processes are executed in accordance with each request type.

Transform Request of Information Life Cycle State

There is obtained (step 304) from the information object management facility (50), in the case of other than a definition of an information object, the definition information for an already present information objects whose information life cycle state may be transformed by the user, or in the case of a definition of an information object, the definition information for an already present information objects whose information life cycle state may be transformed by the user as owner. A list is presented (step 305) to the user by using the information life cycle state presentation facility (80). When the user chooses an information object from the presented information objects whose information life cycle state is to be transferred, or defines a new information object, the information life cycle transform facility (60) is asked (step 306) to tranform the information life cycle state of the information object. If necessary, an operation history obtaining request (step 307) is issued to the information life cycle operation history management facility (34) and a notice request (step 308) is issued to the notice facility (37). Until the information life cycle state transform operation request by the user is completed, steps 305 to 308 are repeated (step 309).

Information Object Operation Request

There is obtained (step 311) from the information object management facility (50) the definition information on an information objects which may undergo an operation request by the user. A list is presented (step 312) to the user by using the information life cycle state presentation facility (80). When the user chooses from the presented information objects an information objects to be operated upon by the user, the information access facility (70) is asked (step 313) for the information object operation. Until the information object operation request by the user is completed, steps 312 and 313 are repeated (step 314).

Information Object Definition Change Request

There is obtained (step 321) from the information object management facility (50) the definition information on information objects whose definition may be changed by the user. A list is presented (step 322) to the user by using the information life cycle state presentation facility (80). When the user chooses from the presented information objects an information object whose definition is to be changed by the user, the information object management facility (50) is asked (step 323) for the information object definition change operation. Until the information object definition change operation request by the user is completed, steps 322 and 323 are repeated (step 324).

Information Accessor Management Request

In the case of other than new user registration, there is obtained (step 331) from the information accessor management facility (40) the definition information on already present users whose request may be accepted. A processed result is displayed (step 332) for the user by using the information life cycle state presentation facility (80). When the user effects a management operation while referring to the processed result displayed on a screen, the information accessor management facility (40) is asked (step 333) for the registration process of the information accessor definition information. Until the information accessor management request by the user is completed, steps 332 and 333 are repeated (step 334).

(B) Information Accessor Management Facility (40)

The process flow of the information accessor management facility (40) is shown in FIG. 5, and the information accessor management information is shown in FIG. 6. The information accessor management facility (40) analyzes (process 401) a request, and asks the information accessor management facility (40) to check (process 402) the validity of the requester in accordance with the information accessor management information (step 420). If invalid, the flow returns (step 403) because of an error. If valid, the process (step 404) is executed in accordance with each request type.

A user registration process (step 405) is executed for a new user registration request, an attribute change process (406) for an already registered user definition information change request, a user deletion process (step 407) for an already registered user deletion request, and a user confirmation process (408) using the information accessor management information (420) for a user validity confirmation request. If an abnormal state such as user duplicate registration, user not registered or the like is found during the process, the flow returns (step 409) because of an error.

The information accessor management information (420) manages users and their access priviledges. The information accessor management information includes a user identification name (421), identification name of available information object (422), information object owner name (423), available information life cycle states for the information object (424), aims of use of the information object for each information life cycle state (425), available operation types (426), and the like.

(C) Information Object Management Facility (50)

Figure 7:
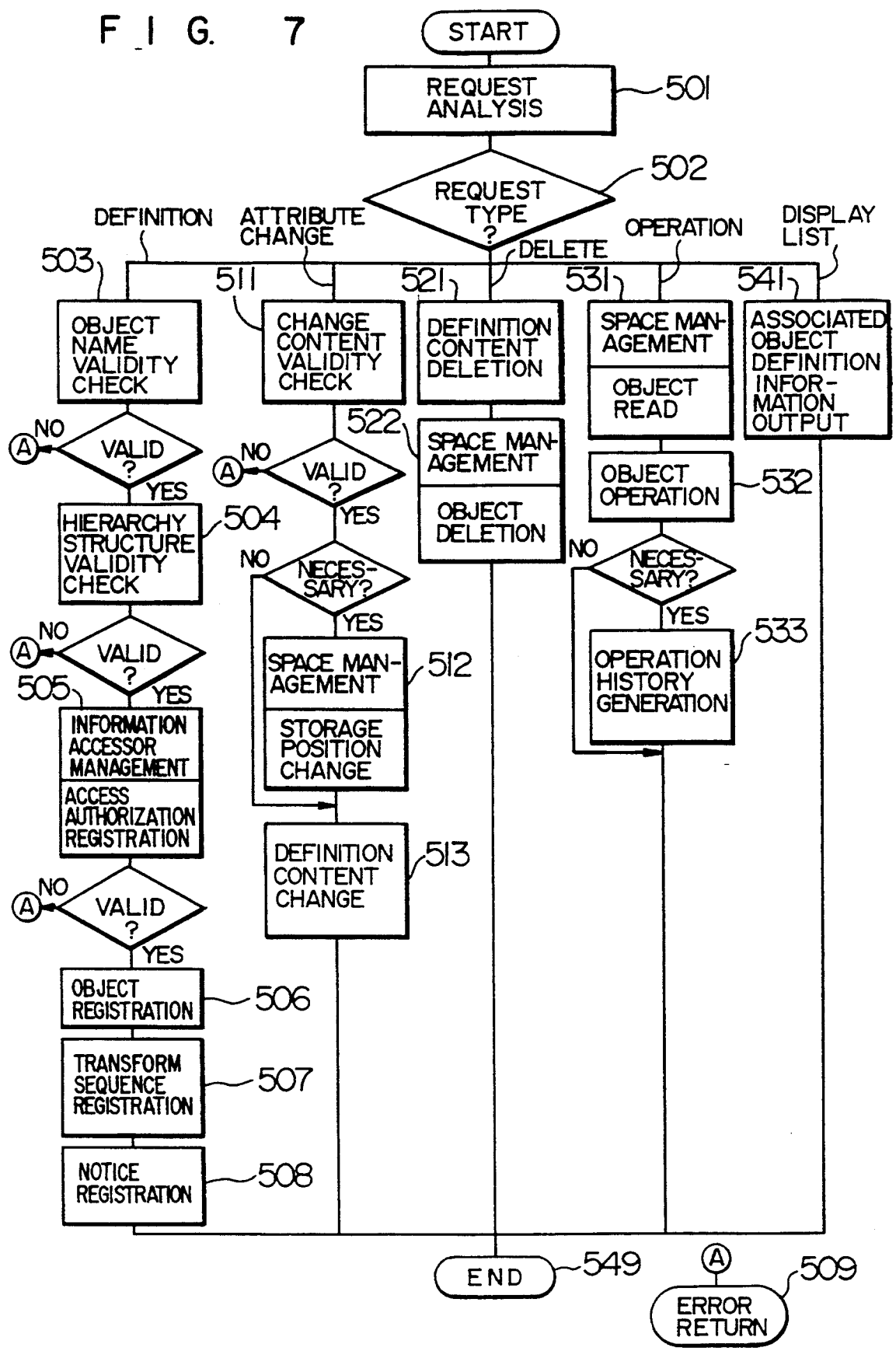
FIG. 7 is a flow chart showing the processes executed by the information object management facility.

The process flow of the information object management facility (50) is shown in FIG. 7, the information object definition information (550) is shown in FIG. 8, and the information object hierarchy management information (570) is shown in FIG. 9. The information object management facility (50) analyzes (process 501) a received request, and executes the process (502) in accordance with the request type.

Information Object Definition Request

The user designates by using the information object definition language (15) the information such as the information object identification name, information object hierarchy structure, generator, approver hierarchy, user, their access privileges, information life cycle state transform sequence, and notice option. The information object management facility (50) checks (step 503) the validity of the information object identification name by using the information object definition information (550). If invalid, the flow returns (step 509) because of an error. If valid, the validity of the information object hierarchy structure is confirmed (step 504) by using the information object definition information (550). If invalid, the flow returns (step 509) because of an error. If valid, the information accessor management facility (40) confirms the validity of the owner name, approver name, generator name, and user name, and asks for their authorization registration (step 505). If invalid, the flow returns (step 509) because of an error. If valid, there is performed (step 506) information object definition registration, the information including the information object hierarchy structure and approver hierarchy. Thereafter, there are performed information life cycle state transform sequence registration (step 507) and notice option registration (step 508), and the flow returns (step 549) in a normal state.

Attribute Change of Already Defined Information Object

First, the validity of the change contents is checked (step 511). If invalid, the flow returns (step 509) because of an error. If valid and in the case of an information life cycle state transformation request, the memory space management facility (90) is asked (step 512) for the change of the information object storage area. The change contents are reflected (513) to the information object definition information (550), information object hierarchy management information (570) and the like.

Deletion of Already Present Information Object

The management information associated with the information object is deleted (step 521) from the information object definition information (550), information object hierarchy management information (570) and the like. The memory space management facility (90) is asked (step 522) for the deletion of the information object.

Operation Request of Reading, Updating and the Like Relative to Information Object The memory space management facility (90) is asked (step 531) for reading the information object to execute (step 532) the operation on the data processing space (11). If necessary, the operation history information is generated (step 533).

Presentation of List of Already Present Information Objects

The management information regarding the information object is obtained (step 541) from the information object definition information (550), information object hierarchy management information (570) and the like, and thereafter the flow returns (step 549).

The information object definition information (550) includes, for each information object, the owner identification name (551), information object identification name (552), generator identification name (554), highest approver identification name (555), notice option flag (556) indicating if the transformation of the information life cycle-state is to be notified, operation history obtaining option flag (557) indicating if the operation history of the information object is to be obtained, transfer control option flag (558) indicating the transform sequence of the information life cycle state is being stored, and approver hierarchy flag (559) indicating if the approver hierarchy is present.

The information object hierarchy management information (570) mainly includes the information object information (571), "parent" information object information over the information object (572), and "child" information object information under the information object (573). The information object information (571) includes the owner identification name (574), information object identification name (575), and information life cycle state (576) relative to the hierarchy structure. The "parent" information object information (572) includes the owner identification name (577) of the higher information object on the hierarchy structure, information object identification name (578), and information life cycle state (579) relative to the hierarchy structure. The "child" information object information (572) includes the owner identification name (580) of the lower information object on the hierarchy structure, information object identification name (581), information life cycle state (582) relative to the hierarchy structure, and layout information (583) indicating the arrangement of "child" information object within the information object.

(D) Information Life Cycle Transform Facility (60)

Figure 10:
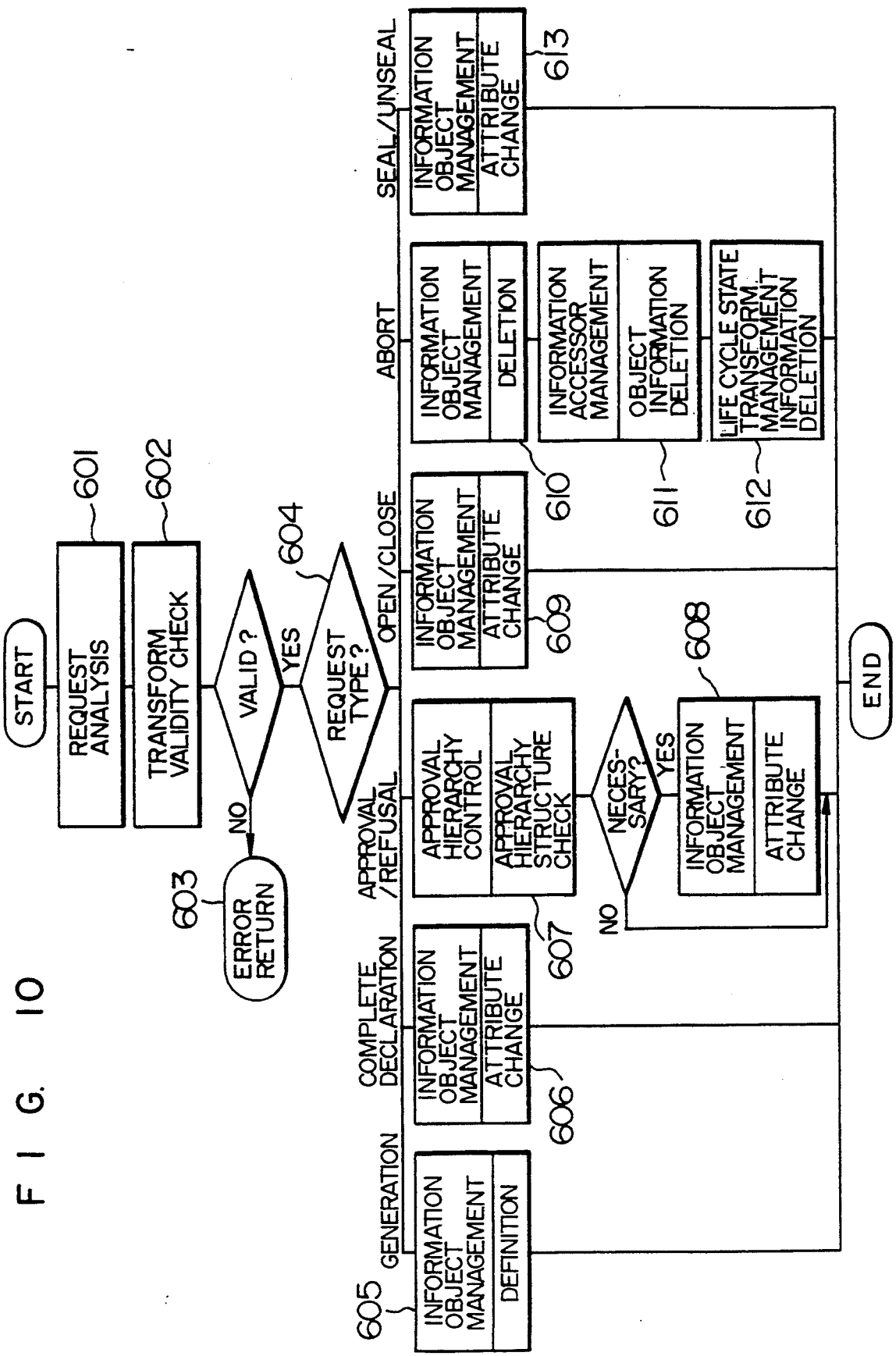
FIG. 10 is a flow chart showing the processes executed by the information life cycle transform facility.

The process flow of the information life cycle transform facility (60) is shown in FIG. 10. FIG. 11 shows the information life cycle state transform control information (630) which manages the transform timing and transform destination state, respectively of the information life cycle state of an information object. FIG. 12 shows the information life cycle state transform sequence management information (640) which manages the transform order of the information life cycle state. The information life cycle transform facility (60) analyzes (step 601) a received request, and checks the validity of the transform order and transform timing while referring to the information life cycle state transform control information (630) and information life cycle state transform sequence management information (640). If invalid, the flow returns (step 603) because of an error, and if valid, the process (step 604) is executed in accordance with the request type.

Information Object Generation Request

An information object definition request (step 605) is made relative to the information object management facility (50).

Information Object Completion Declaration Request

An information object attribute change request (step 605) is made relative to the information object management facility (50).

Information Object Approval or Refusal Request

An approval hierarchy structure is checked (step 607) by using the approval hierarchy control facility (65). If the information life cycle state is required to be transformed, an information object attribute change request (step 608) is made relative to the information object management facility (50).

Information Object Open or Close Request

An information object attribute change request (step 609) is made relative to the information object management facility (50).

Information Object Abort Request

An information object deletion request (step 610) is made relative to the information object management facility (50). The information accessor management facility (40) is asked (step 611) for deleting the information associated with the information object. The information which manages the information life cycle state transformation of the information object is then deleted (step 612).

Information Object Seal Request

An information object attribute change request (step 613) is made relative to the information object management facility (50).

The information life cycle state transform control information (630) includes the information object owner identification name (631), information object identification name (632), transform originating information life cycle state (633), transform destination information life cycle state (634), and transform timing (635).

The information life cycle state transform sequence management information (640) includes the information object owner identification name (641), information object identification name (642), and information life cycle state transform skip flag (643) for controlling the skip of transform of the information life cycle state. The position of each bit in the information life cycle state transform skip flag (643) indicates the information life cycle state to be skipped in transforming.

(E) Information Access Facility (70)

Figure 13:
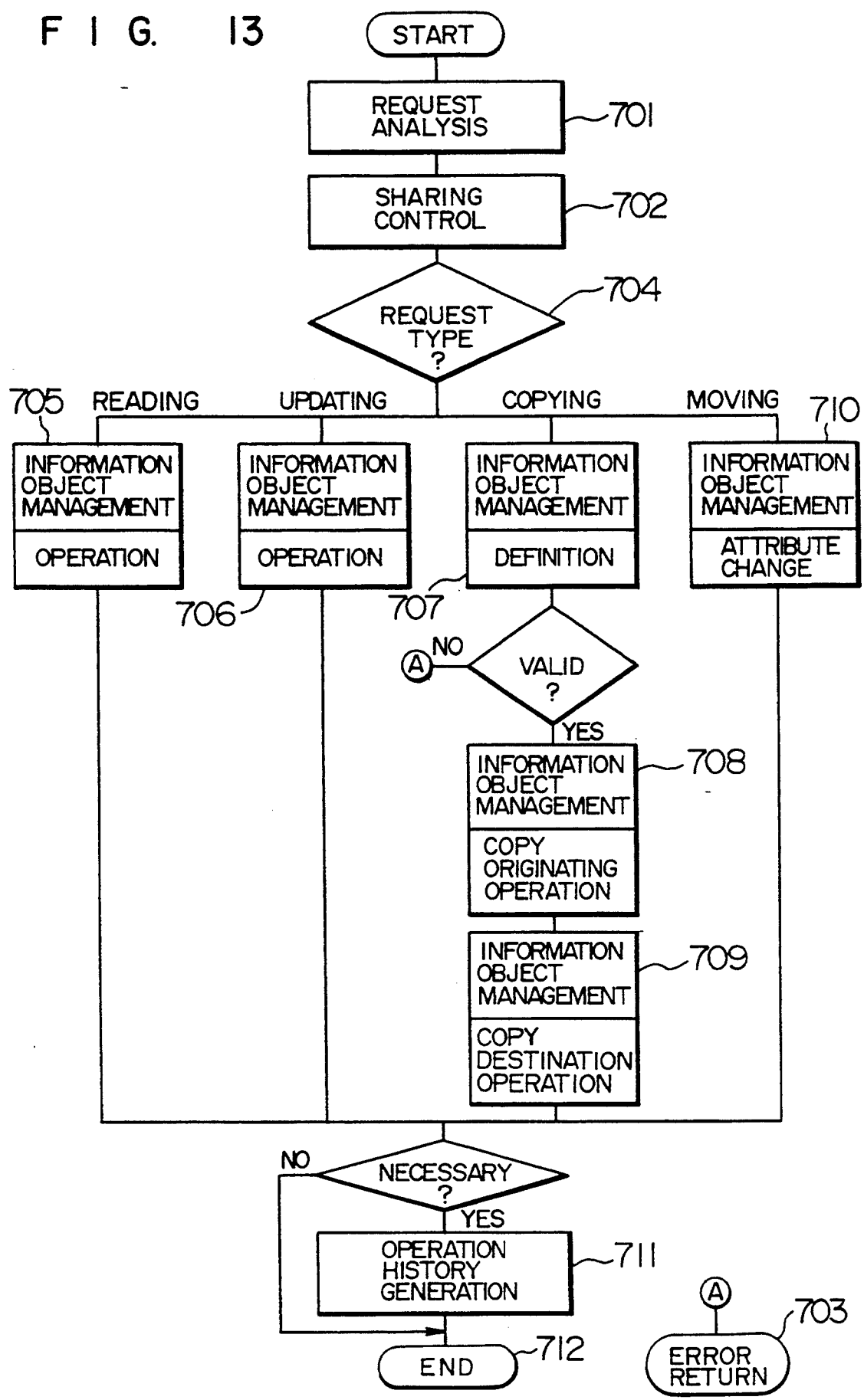
FIG. 13 is a flow chart showing the processes executed by the information access facility.

FIG. 13 shows the process flow of the information access facility (70). The information access facility (70) analyzes (step 701) a received request to perform a sharing control (step 702) of the requested information object. If sharing is not possible, the flow returns (step 703) because of an error. If possible, a process (step 704) is executed in accordance with the request type.

Information Object Reference Request

The information access facility (70) asks (step 705) for an operation by the information object management facility (50).

Information Object Updating Request

An operation is also asked (step 706) to the information object management facility (50).

Information Object Copying Request

The definition of the copying destination information object is asked (step 707) to the information object management facility (50). If invalid, the flow returns (step 703) because of an error. If valid, reading the copying originating information object is asked (step 708) to the information object management facility (50), and further writing the copying destination information object is asked (step 709).

Information Object Moving Request

An attribute change for changing the owner is asked (step 710) to the information object management facility (50).

Lastly, if necessary, an operation history is formed (step 711), and thereafter the flow returns (step 712) in an ordinary state.

(F) Information Life Cycle Operation History Management Facility (34)

FIG. 14 shows an example of the operation history information (340) which is obtained and managed by the information life cycle operation history management facility (34).

The operation history information (340) includes the identification name (341) of a user or operator, operation time (342), operation place (343) indicating such as the identification name of a terminal (2) operated upon operation, operation target (344), operation type (345) such as reading and updating, and operation contents (346). The operation target (344) includes the information object identification name (347), information object owner identification name (348), and information life cycle state (349) at the time of operation. The operation contents (346) include the value (350) before operation, and value (351) after operation.

(G) Information Life Cycle State Presentation Facility (80)

FIG. 15 shows an example of displays on a screen of the terminal (2) by the information life cycle state presentation facility (80).

The display example (810) indicates the available information object definition information which is used in choosing an information object to be used by the user. The information life cycle state presentation facility (80) displays the information object definition information on a different window (811) for each information life cycle state. For example, the first window (811) displays the information object definition information in the open state (26), and the second window (811) displays the information object definition information in the approved state (23).

The display example (820) indicates the contents of the information object to be operated by the user. In this embodiment, the information object (821) and information object (822) are in the hierarchy structure. The lower information object (822) is displayed while being inserted within a proper area of the upper information object (821). If the information life cycle state is different between these information objects, the information life cycle state presentation facility (80) displays the contents of the information object (821) and information object (822) with different background color.

(H) Approval Hierarchy Control Facility (65)

FIG. 17 shows the process flow of the approval hierarchy control facility (65), and FIG. 18 shows an example of the approval hierarchy management information (680). The approval hierarchy control facility (65) analyzes (step 651) a received request, and executes a process (step 652) in accordance with the request type.

In the case of an approval request, it is checked (step 653) by using the approval hierarchy control information (680) if the approval request is the first one to the information object. If the first one, it is checked (step 654) by using the information object hierarchy justice information (550) and information object hierarchy management information (570) if all the lower information objects have already made the completion declaration. If not, the flow returns (step 654) because of an error. If not the first one, this process is not performed. Next, it is checked (step 656) by using the approval hierarchy management information (680) if the approval operation conforms with the approval hierarchy order. If not, the flow returns (step 655) because of an error. If yes, the approval operation is registered (step 657) in the approval hierarchy management information (680), and it is checked (step 658) if the approval operation was effected by the highest approver. If the highest approver, the fact that the information object and lower information objects can be transformed to the approved state (28) is set (step 659), and thereafter the flow returns (step 660).

In the case of the refusal operation, it is checked (step 661) by using the approval hierarchy management information (680) if the refusal operation conforms with the approval hierarchy order. If not, the flow returns (step 655) because of an error. If yes, the lower approval operations are reset (step 662) by referring to the approval hierarchy management information (660), and the fact that the information object is transformed to the incomplete state (21) is set (step 663). The flow thereafter returns (step 660).

The approval hierarchy management information (680) has three approvers at the maximum by way of example. The approval hierarchy management information (680) includes the information object identification name (681), owner identification name (682), highest approver information (683), lower approver information (684), and lowest approver information (685). Each approver information includes the approver identification name (686) and approval time (687). Until the approval is effected, the approval time (687) is remained empty.

(I) Memory Space Management Facility (90)

Figure 20:
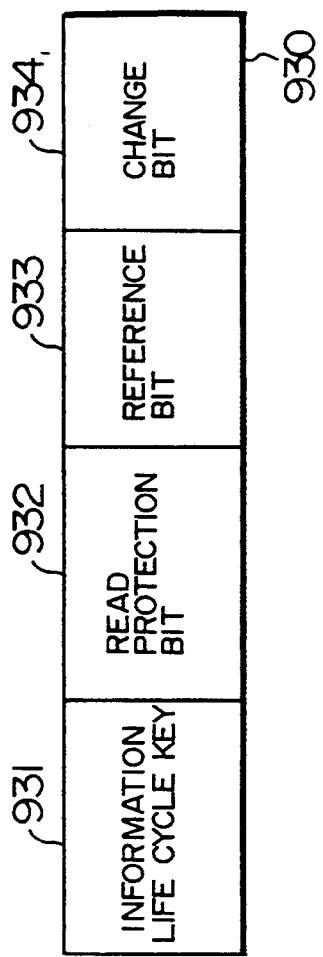
FIG. 20 illustrates memory space protection key.
Figure 21:
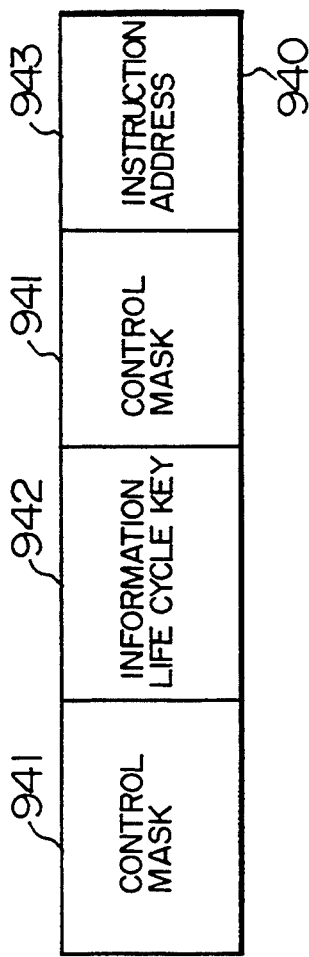
FIG. 21 illustrates memory space access key.
Figure 19:
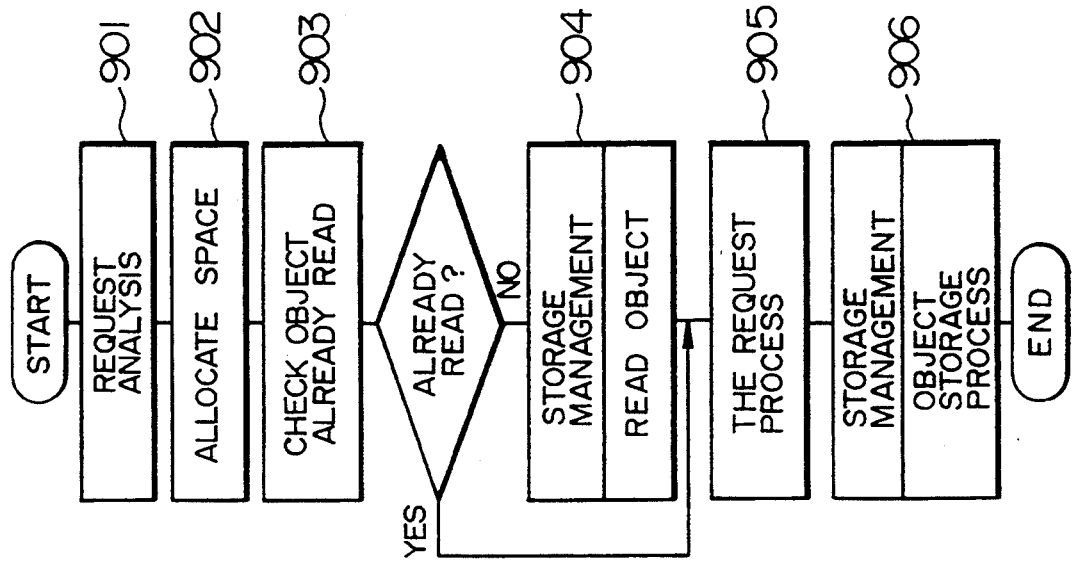
FIG. 19 is a flow chart showing the processes executed by the memory space management facility.

FIG. 19 shows the process flow of the memory space management facility (90), FIG. 20 shows the memory space protection key (930), and FIG. 21 shows the memory space access key (940).

The memory space management facility (90) analyzes (step 901) a received request, and allocates (step 902) the data processing space (11) in accordance with the information life cycle state of the information object to be processed. Next, it is checked (step 903) if the information object to be processed has already been read or not. If not, reading the information object is asked (step 904) to the storage management facility (95). The above-described space management process (step 905) is conducted on each data processing space in accordance with the request type, and a storage processing request for the information object is made (step 906) relative to the storage management facility (95).

The memory space protection key (930) is used for protecting the memory space by detecting the undue read/write relative to the data processing space (11) caused by errors of hardware or software. The data processing space (11) is divided into blocks of specific size, each block being provided with the memory space protection key (930). The memory space protection key (930) includes a key (931) indicating the information life cycle state of the information block disposed in the block, read protection bit (932) indicating if the memory space protection is applied only to the write operation or both to the read and write operations, reference bit (933) which is set at the read and write operations, and change bit (934) which is set at the write operation.

The memory space access key (940) is hardware instruction execution control information corresponding to, e.g., the program status word (PSW) described in the Hitachi M Series Processor Manual. The memory space access key (940) includes a control mask (941) at the time of interruption occurrence, key (942) indicating the information life cycle state of the information object of the originating process requester, and instruction address (943) indicating the address of an instruction to be next executed.

When a process is executed, the information processor (1) compares the keys (931) and (942) respectively of the memory space protection key (930) and memory space access key (940). If both the keys are coincident, the process is executed. If not, execution is judged in accordance with the read protection bit (932). A write operation is inhibited for the information life cycle state which inhibits the updating operation.

(J) Notice Facility (37)

The notice control information (370) used by the notice facility (37) is shown in FIG. 22. The notice control information (370) includes the identification name (371) of an information object to be notified, information object owner identification name (372), and notifying information (373). The notifying information (373) includes the user or notifying party identification name (374), and bit (375) indicating the information life cycle object to be notified. When the information object managed by the notice information control information (370) changes to the information life cycle indicated by the bit (375), the notice facility (37) sets the notifying information into the mail box of the user indicated by the user identification name (374). By checking the mail box, the user can be notified of the information life cycle state transfer of the particular information object.

(K) Storage Management Facility (95)

FIG. 23 shows an embodiment of the storage management control information (950) used by the storage management facility (95) to determine the storage area of an information object. In this embodiment, the storage area is chosen in accordance with the information life cycle state. The storage management control information (950) includes the information life cycle state (951), site identification name (952) where there is a computer which manages the information object at the identified information cycle state, and storage data set identification name (953) at the identified site. In a more preferred embodiment, the storage area may be chosen for each information objects divided in accordance with a certain criterion. The provision of the facilities of the above-described embodiment results in the following advantageous effects:

(1) The information life cycle operation history management facility records the operation history regarding the information life cycle state transform operation effected for each information object or regarding the information access operation effected at each information life cycle state, deletes the operation contents effected for a job in accordance with the operation history information when the system failure occurs during executing the job, or provides the operation history information for the purpose of analyzing the operation contents or reporting the operation status to the user.

(2) The information life cycle state presentation facility can provide the user with the discrimination information on each life cycle state of the information objects to be used, and if the information objects is to be displayed on a terminal screen, displays the visually discriminable information life cycle state of each information object to thereby realize an improved user operability and avoid an erroneous operation.

(3) If one or more approvers of an information object are present and constitute the approver hierarchy, the approval hierarchy control facility manages the information life cycle state transformation in accordance with the approver hierarchy to thereby directly realize the approval procedure in practical world.

(4) The memory space management facility dynamically allocates the data processing space to each information object to be processed, in accordance with the information life cycle state, and processes the information object at each information life cycle state safely and efficiently by properly processing the data on the memory space.

(5) When the information life cycle state of the predetermined information objects changes, the notice facility notifies the previously registered user of the change contents to thereby realize easy operation of the information object.

(6) The storage management facility manages each information object at a proper storage area in accordance with the information life cycle state to thereby realize the safety and easy operation of the information object.

(7) The program library management facility manages and operates computer software by applying the information life cycle management system described in the above items (1) to (6) to the development environments of computer software such as programs, and in accordance with the life cycles of the computer software starting with the development and ending with aboring.

(8) The database management facility manages and operates a database by applying the information life cycle management system described in the above items (1) to (6) to the database management environments, and in accordance with the data life cycles starting with registration and ending with deletion.

(9) The document management facility manages and operates documents or design drawings by applying the information life cycle management system described in the above items (1) to (6) to the documents or design drawings environments, and in accordance with the document life cycles starting with generation and ending with aborting.

According to the above embodiment, the following advantageous effects are obtained:

(1) The burden on information operation is reduced by the information management which is performed in accordance with the information life cycle state;
(2) The information object can be efficiently managed for each information life cycle state; and
(3) The information of literary works can be safely managed.

Next, another embodiment of this invention will be described in detail with reference to FIGS. 24 to 44, wherein information, database in this case, is managed by using a system almost the same as the above-described information life cycle management system. In the following description, it is assumed that a data model provided by a database management system is used as a relational model. The relational model is a data model having a table structure as seen in the example of the table definition management table 1031 shown in FIG. 28. The column of the table corresponds to a conventional file field, and the row corresponds to a record. In the following embodiment, the description is given on the assumption that one record corresponds to one information object. The database management system herein described means a program for managing user information.

Figure 25:
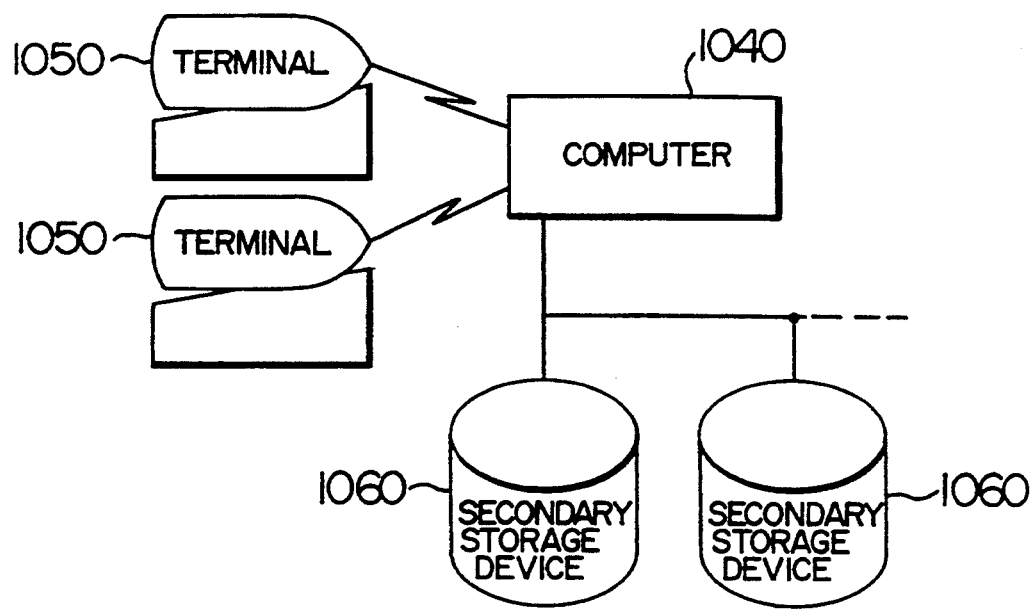
FIG. 25 shows an example of the hardware arrangement practicing the embodiment shown in FIG. 24.

FIG. 25 shows the minimum hardware arrangement practicing this embodiment. In FIG. 25, reference numeral 1040 designates a computer on which the database management system realizing this embodiment runs, 1050 a terminal (keyboard and display) for interface with a user, and 1060 a secondary storage device for storing database and data dictionary. There are generally provided a plurality of terminals 1050 and secondary/ storage devices 1060.

As a first embodiment of the data management system, there is presented a case where the information life cycle state (we call "state" below) is managed in units of table. FIG. 28 illustrates the table definition information management table 1031 retained in a data dictionary 1030, with the state information column 1034 being added thereto. Changing the contents of the state information column 1034 means the change of the state of all records within the table.

In the example shown in FIG. 28, one record (row) of the table definition information stored in the table definition information management table 1031 signifies the definition information of one table. The table definition information includes a owner name 1032, table name 1033 as well as state cede information 1034. The contents of the state code information are adapted to be distinguishable between the following four states:
Incomplete state (we call 'unsettled state' below)
Approved state
Open state
Seal state wherein the information in the incomplete/approval state is sealed
Seal state wherein the information in the approved state is sealed In FIG. 28, the table name (1033) "employee" of the owner (1032) "Satoh" is in the unsettled state (code:00). The operation will now be described below.

Figure 24:
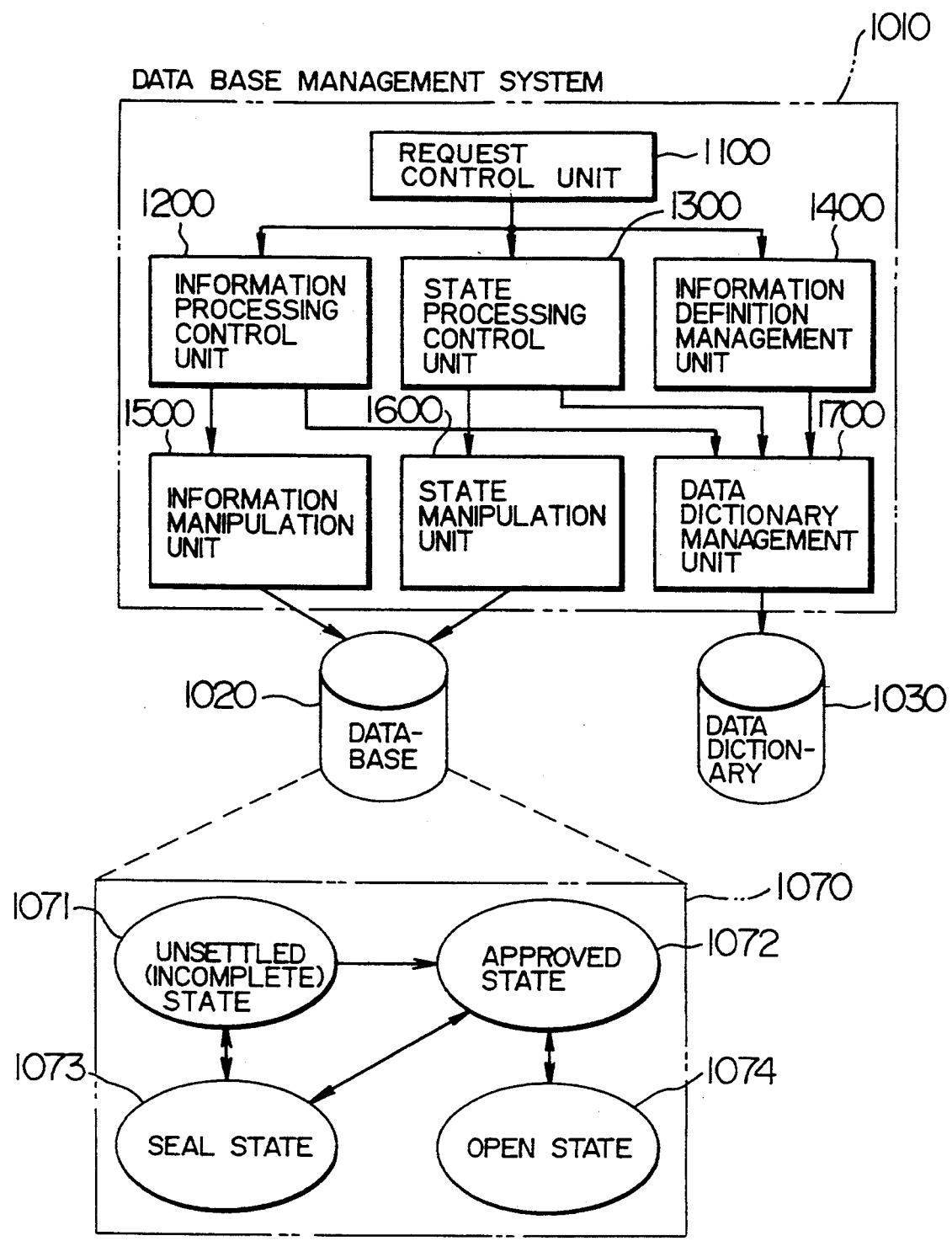
FIG. 24 is a block diagram showing an functional arrangement of an embodiment of the database management system of this invention.

FIG. 24 shows the database system arrangement to which the present invention is applied. This system is constructed of a database management system 1010, database 1020, and data dictionary 1030. The database management system 1010 is a software which runs on the computer 1040. The database management system 1010 is constructed of, as shown in FIG. 24, a request control unit 1100, information processing control unit 1200, state processing control unit 1300, information definition management unit 1400, information manipulation unit 1500, state manipulation unit 1600 and data dictionary management unit 1700.

The rectangular block 1070 under the database 1020 indicates the state transition which can be requested relative to the information (in this case, table storing the information) stored in the database 1020. The information in the unsettled state 1071 enters into the approved state 1072 upon an approval operation. The information in the approved state 1072 enters into the open state 1074 upon an open operation. The information in the open state 1074 returns to the approved state 1072 upon a close operation. The information in the approved state 1072 or unsettled state 1071 enters into the seal state 1073 upon a seal operation. The information in the seal state 1073 returns to the state before the seal state upon a seal release operation. It is not allowed to return the information once entered into the approved state 1072, to the unsettled state 1071.

The information within the data dictionary 1030 is usually allowed to be referenced by a user in order to facilitate the data base management. Similar to the conventional, a user can also know the information state by referring to the table definition information management table 1031 within the data dictionary 1030.

Figure 33:
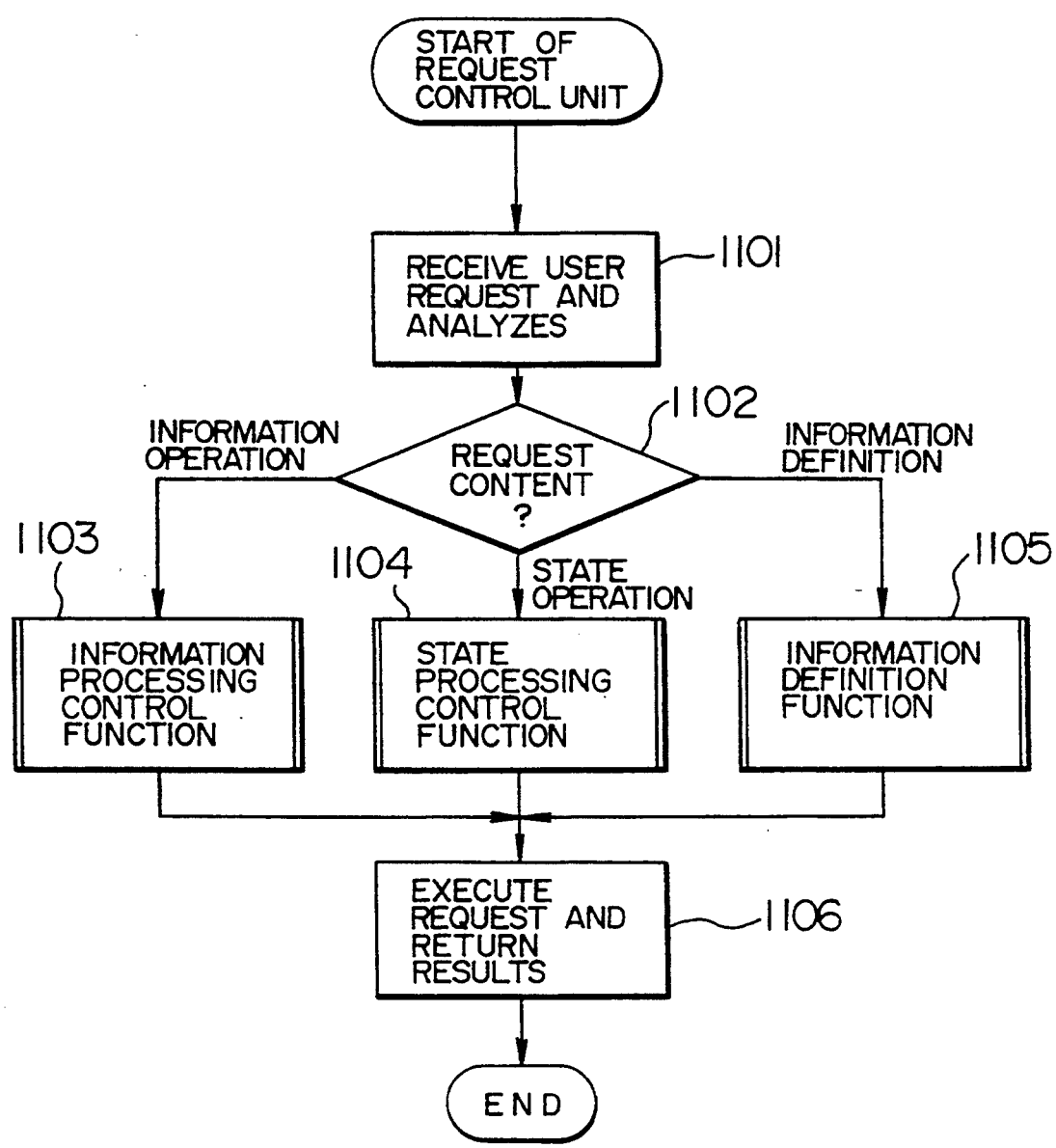

A request by a user to the data base management system 1010 is first received by the request control unit 1100. The process flow by the request control unit 1199 is shown in FIG. 33. The request control unit 1100 receives a request by a user and analyzes the request contents (step 1101). The request contents are checked (step 1102). If the contents indicate an information operation request, the information processing control unit 1200 is called (step 1103). In case of a state operation request, the state processing control unit 1300 is called (step 1104). In case of an information definition and authorization definition request, the information definition management unit 1400 is called (step 1105). If the processings at each management unit are completed, the executed results are sent back to the user (step 1106) to terminate the processing.

The process flow by the information processsing control management unit 1200 is shown in FIG. 34. The information processing control unit 1200 analyzes the requested operation contents (step 1201), and thereafter checks the presence of the processed object (step 1202), the user authorization (step 1203) and the process validity (step 1204), while calling the data dictionary management unit 1700 and picking up therefrom the definition information and authorization definition of the requested object. Specifically, in the case of a search request, if the table to be searched is in the open state or in the approved or unsettled state with authorized search, then search is allowed. In the case of an updating request, if the table to be updated is in the unsettled state with authorized updating, then updating is allowed. If there is no error at these check steps, the information manipulation unit 1500 is called (step 1205), to request to execute the requested processing. After completion of the processing, the results are sent back to the originating requester (step 1206).

Figure 26:
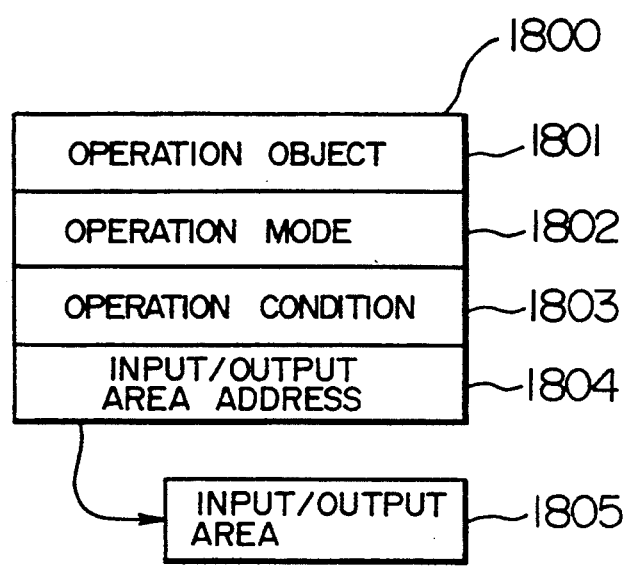
FIG. 26 shows an example of interface parameters which is passed from the information processing control unit to the information manipulating unit.

The information processing control unit 1200 passes parameter information 1800 such as shown in FIG. 26 to the information manipulation unit 1500. The object 1801 of the parameter information 1800 to be operated is a discriminator of a table to be operated. An operation mode 1802 is code information which discriminates the operation contents, i.e., search, addition, change and deletion of information. An operation condition 1803 is a condition of information (record) to be operated. An input/output area address 1804 is an address of an input/output area 1805 in which stored is a value to be set to the record at the addition and change operations. In the case of search, the input/output area 1805 becomes the area for receiving the search results, and the input/output area address 1804 becomes its address.

Figure 36:
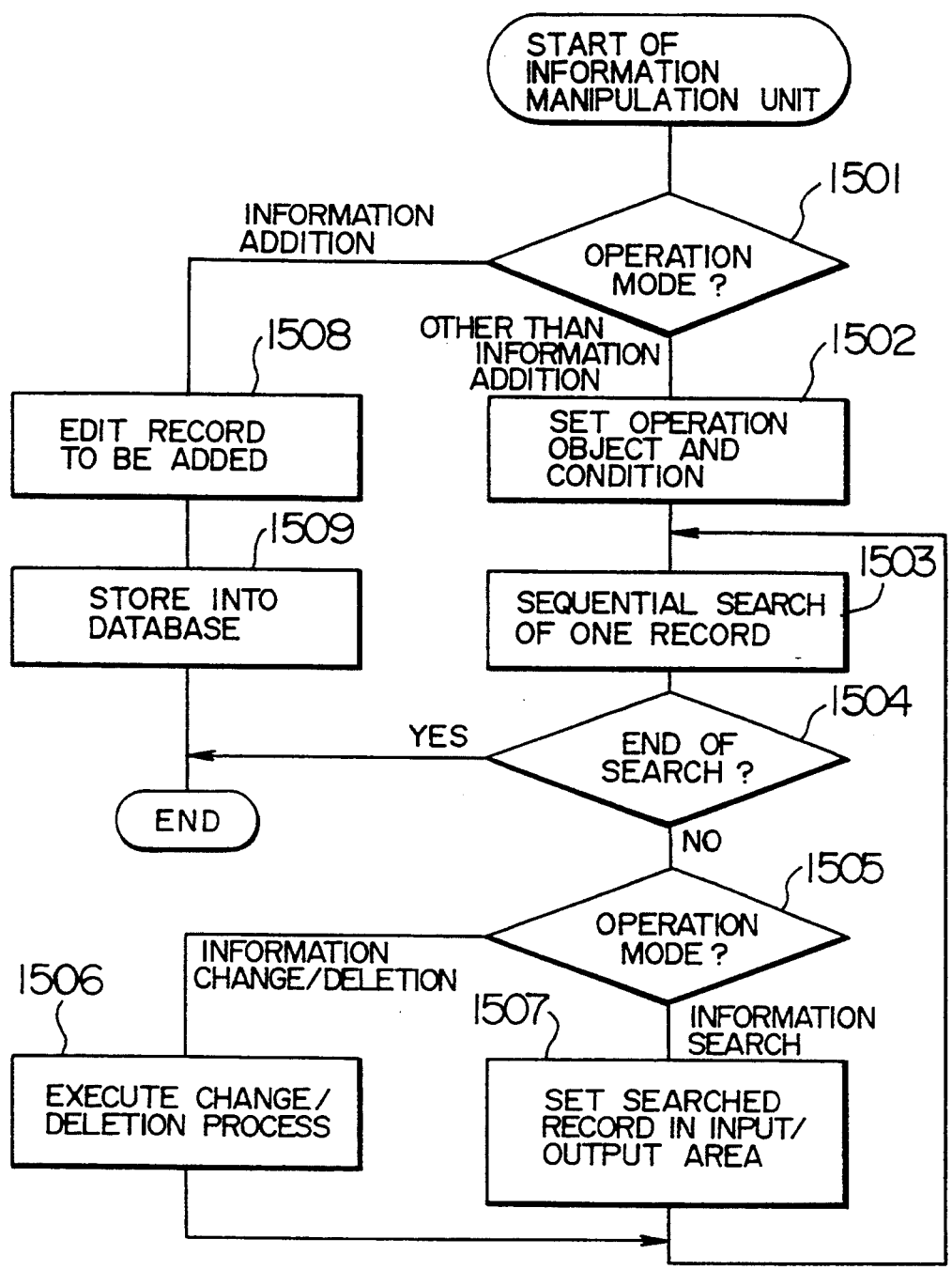

The process flow by the information manipulation unit 1500 is shown in FIG. 36. The information manipulation unit 1500 selects the processing in accordance with the operation mode 1802 of the parameter information 1800 (step 1501). In the case of an addition operation mode, there is generated a record having a value set in the input/output area 1805 (step 1508), and the record is stored in a table designated by the operation object 1801 (step 1509). In other cases, the operation contrition 1803 used for picking up the record to be operated is set by using the table designated by the operation object 1801 (step 1502), and the processes at steps 1504 to 1507 are repeated until the record search is completed.

Specifically, after completion of the record search (step 1503), it is checked if the search is completed (step 1504). If not, the operation mode is checked (step 1505). In the case of information search, the searched record is set at the input/output area 1805 and sent back to the user (step 1507). In the case of information change, the searched record is changed to that designated by the input/output area 1805 and returned to the table. In the case of information deletion, the record to be searched is deleted (step 1506).

The process flow by the state processing control unit 1300 is shown in FIG. 35. The state processing control unit 1300 analyzes the requested operation contents (step 1301) and thereafter, checks the presence of the processed object (step 1302), the user authorization (step 1303) and the process validity (step 1304), while calling the data dictionary management unit 1700 and picking up therefrom the definition information and authorization definition of the requested object. Specifically, in the case of an open operation request, it is necessary that the table to be operated is in the approved state and is not in the seal state. In the case of a close operation request, it is necessary that the table to be operated is in the open state. In the case of an approval request, it is necessary that the table to be updated is in the unsettled state. If there is no error at the check steps, the state operation processing and execution unit 1600 is called (step 1305) to execute the requested processing. After completion of the processing, the results are sent back to the requester (step 1306).

The state processing control unit 1300 passes the parameter information 1810 shown in FIG. 27 to the state manipulation unit 1600. The operation object 1811 of the parameter information 1810 is a discriminator of a table to be operated. The operation mode 1812 is code information indicating the operation contents, i.e., approval, open/close, seal/unseal, and state information search.

Figure 37:
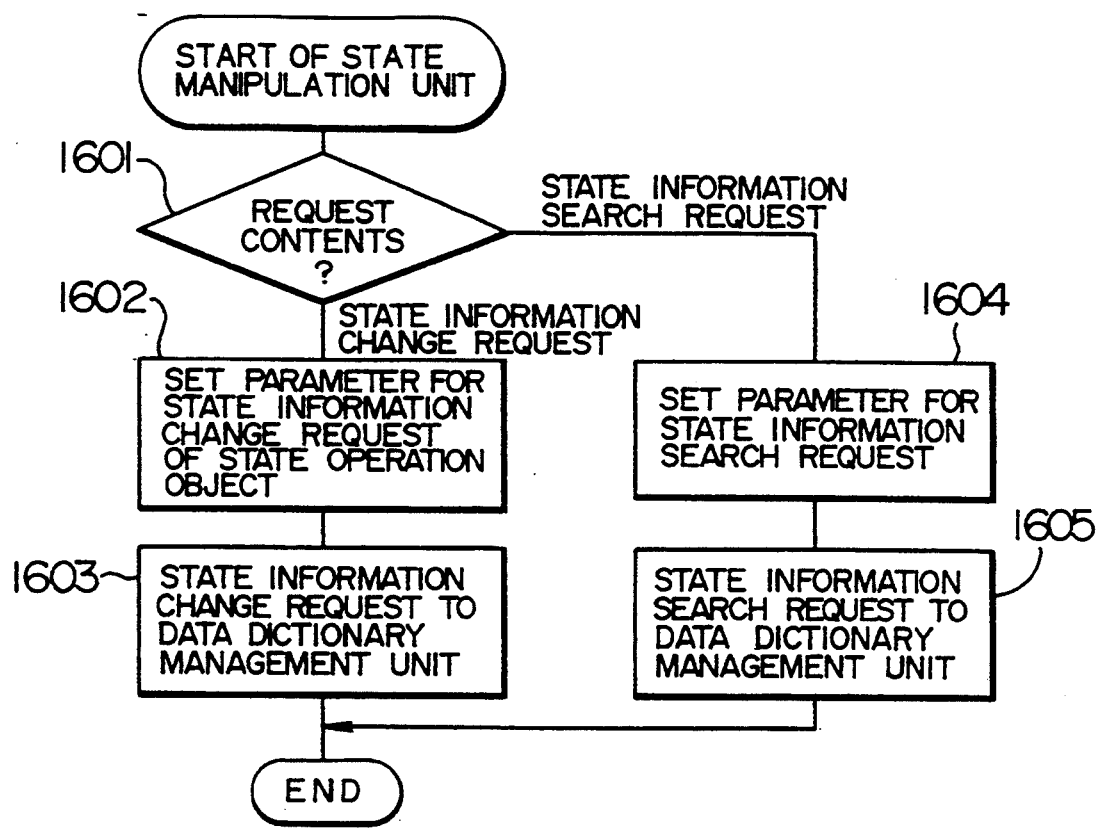

The process flow by the state manipulation unit 1600 is shown in FIG. 37. The state manipulation unit 1600 executes the requested processing in accordance with the parameter information 1810. First, the request contents are checked (step 1601). If the request contents indicate the state information search request, the parameters such as the search object are set (step 1604). The state information search request is sent to the data dictionary management unit 1700 (step 1605). In the case of a state information change request, the parameters such as the change object and change contents are set (step 1602). The state information change request is sent to the data dictionary management unit 1700 (step 1603).

The information definition management unit 1400 calls the data dictionary management unit 1700 to pick up therefrom the definition information and authorization information of the requested information. The validity of the processing is checked, and if there is no error, the data dictionary management unit 1700 is caused to execute the requested processing. The process flow thereof is not shown.

Figure 38:
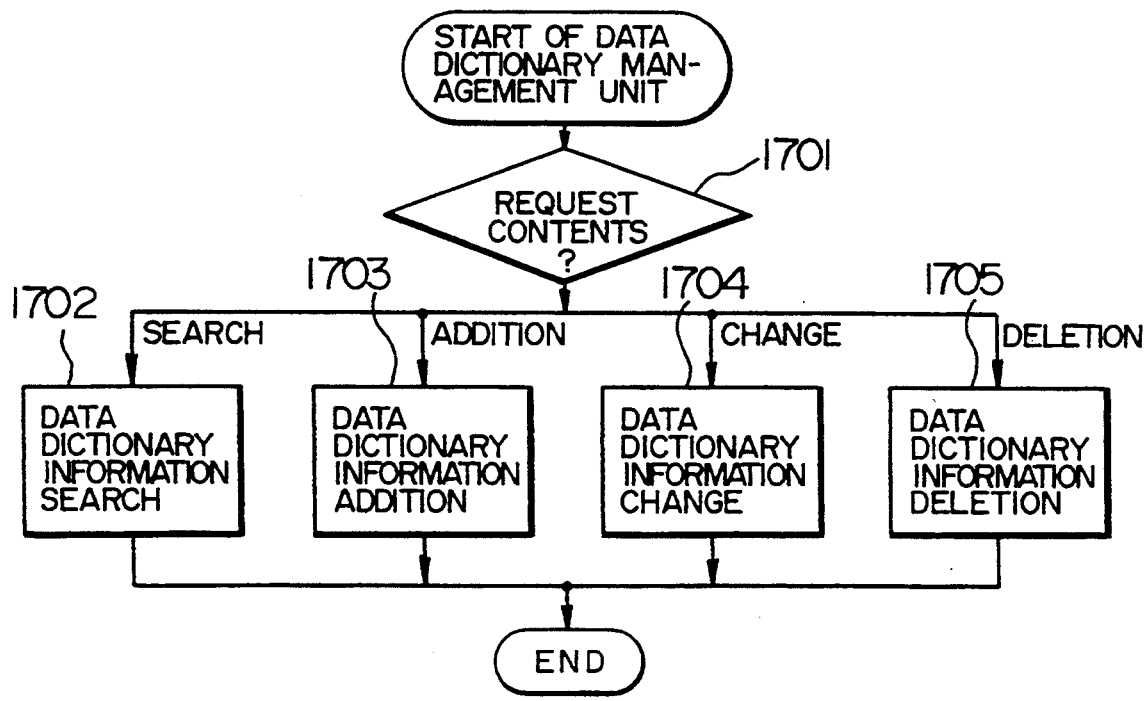

The data dictionary management unit 1700 is called by the information processing control unit 1200, state processing control unit 1300, or information definition management unit 1400, to then execute the requested processing. The process flow by the data dictionary management unit 1700 is shown in FIG. 38. First, the request contents are checked (step 1701). If the request contents indicate a search request, the information within the designated data dictionary is searched and sent back (step 1702). In the case of an addition request, the designated record is added to the designated dictionary table (step 1703). In the case of a change request, the designated record within the designated data dictionary table is changed (step 1704). In the case of a deletion request, the designated record is deleted from the designated data dictionary table (step 1705).

The embodiment for managing the information state in units of table has been described above. Since the information state is managed in units of table in this method, both implementation and state management become easy.

Next, a second embodiment of the data base management system will be given which is suitable for a user who wishes to finely manage the information state for each information.

In this embodiment, in order to manage the state in units of information, i.e., record, the state information is held in a record. The information storing method is shown in FIG. 29 wherein a state information stored in a record 1820 is shown by way of example. A state code 1822 representative of the state is set between a header field 1821 and record main field 1823.

Set as the state code 1822 is a code identifying one of the unsettled state, approved state, open state, and seal state. Since the seal state, and unsettled state or approved state, may be used in unison, it is classified into an unsettled seal state and approved seal state. Alternatively, the state code 1822 may be constructed of a bit train so that each bit corresponds to each state which is judged in accordance with the on/off of each bit. In either case, the state change is effected by changing the value of the state code 1822.

The operation will now be described.

The functions and structure of the database management system 1010 are the same as the first embodiment shown in FIG. 24. The processing by the request control unit 1100 is the same as the first embodiment. Different from the first embodiment are the process flows of the information processing control unit 1200, information manipulation unit 1500, state processing control unit 1300 and state manipulation unit 1600. Each process flow will be given below.

The process flow by the information processing control unit 1200 of this embodiment is shown in FIG. 39. The difference from the first embodiment shown in FIG. 34 is that the validity check process (step 1204) shown in FIG. 34 changes to a parameter information generation process (step 1208). In this embodiment also, the information processing control unit 1200 passes the parameter information 1800 shown in FIG. 26 to the information manipulation unit 1500. In this case, the operation mode 1802 changes to the code information identifying the operation contents of one of the search only for the information in the open state, search for the information other than in the seal state, addition, change, and deletion. The search request by an unauthorized user is limited only to the search for the information in the open state. The search request by an authorized user is directed to the search for the information other than in the seal state. An addition, change, or deletion request is received as it is. Other parameters are the same as the first embodiment.

Figure 41:
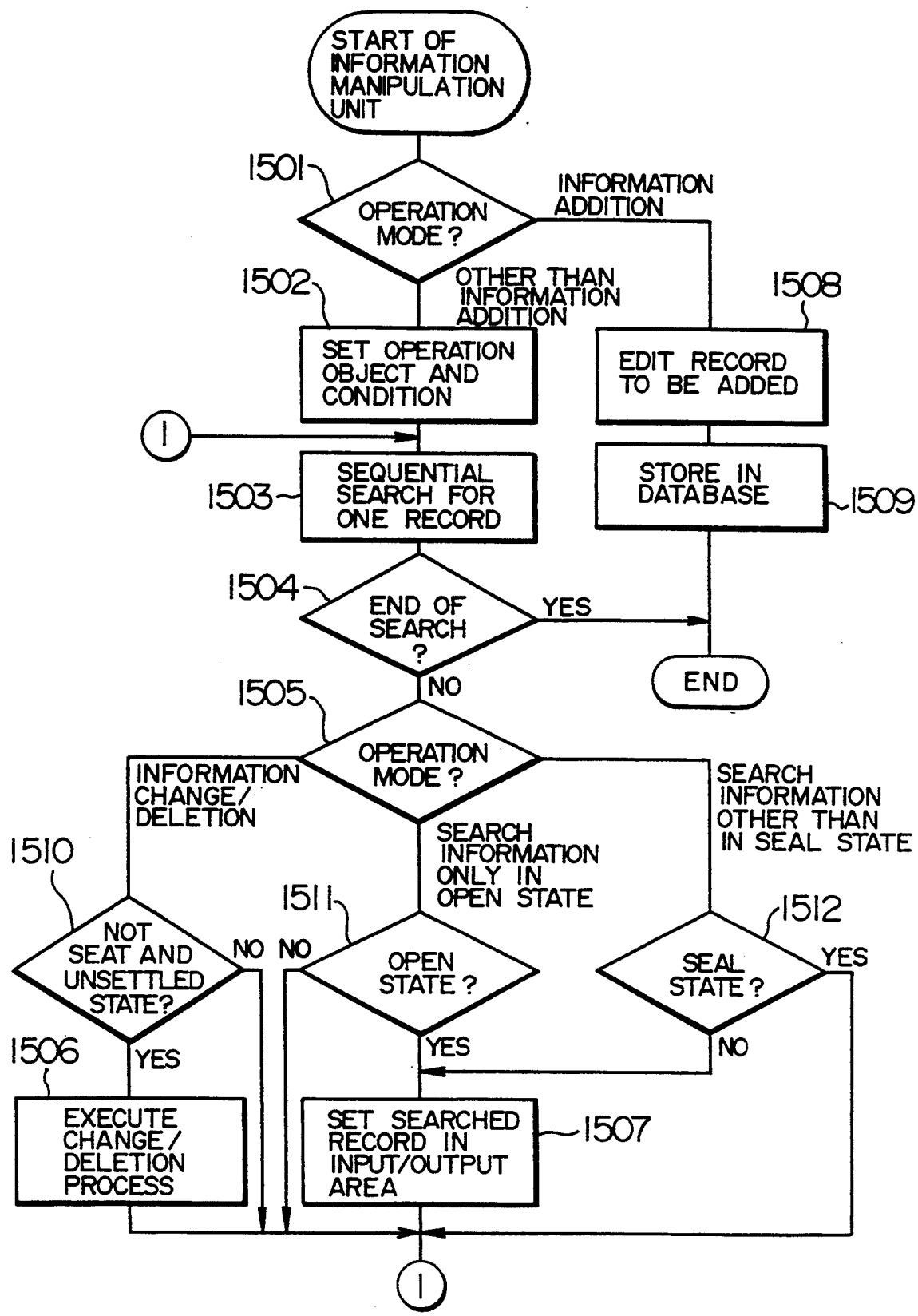

The process flow of the information manipulation unit 1500 is shown in FIG. 41. The information manipulation unit 1500 executes a requested processing in accordance with the parameters 1800. In the case of the addition processing, similar to the first embodiment, a record having a value set in the input/output area 1805 is generated and stored as in the unsettled state in the table designated by the operation object 1801 (steps 1501, 1508, 1509). In other cases, a record satisfying the operation condition 1803 is picked up from the table designated by the operation object 1801. The difference from the first embodiment is that the processes after the record search are branched in accordance with the difference of operation mode as in the following:

(1) Search for Information in Open State Only

The searched record is checked if it is in the open state (step 1511). The record in the open state only is set in the input/output area 1805 (step 1507).

(2) Search for Information Other Than Seal State

The searched record is checked if it is in the seal state (step 1512). The record other than in the seal state only is set in the input/output area 1805 (step 1507).

(3) Change and Deletion

The searched record is checked if it is now in the seal state and is in the unsettled state (step 1510). If so, the requested change or deletion process is executed (step 1506).

The process flow by the state processing control unit 1300 is shown in FIG. 40. The difference from the first embodiment is that the validity check process (step 1304) changes to a parameter information generation process (step 1308). Since the state information is stored in units of record, the state judgement and state operation validity check cannot be conducted until the record is actually searched. Therefore, in this case, the parameter information 1810 such as shown in FIG. 27 is generated and passed to the state manipulation unit 1600. The contents of the parameter information are the same as the first embodiment.

Figure 42:
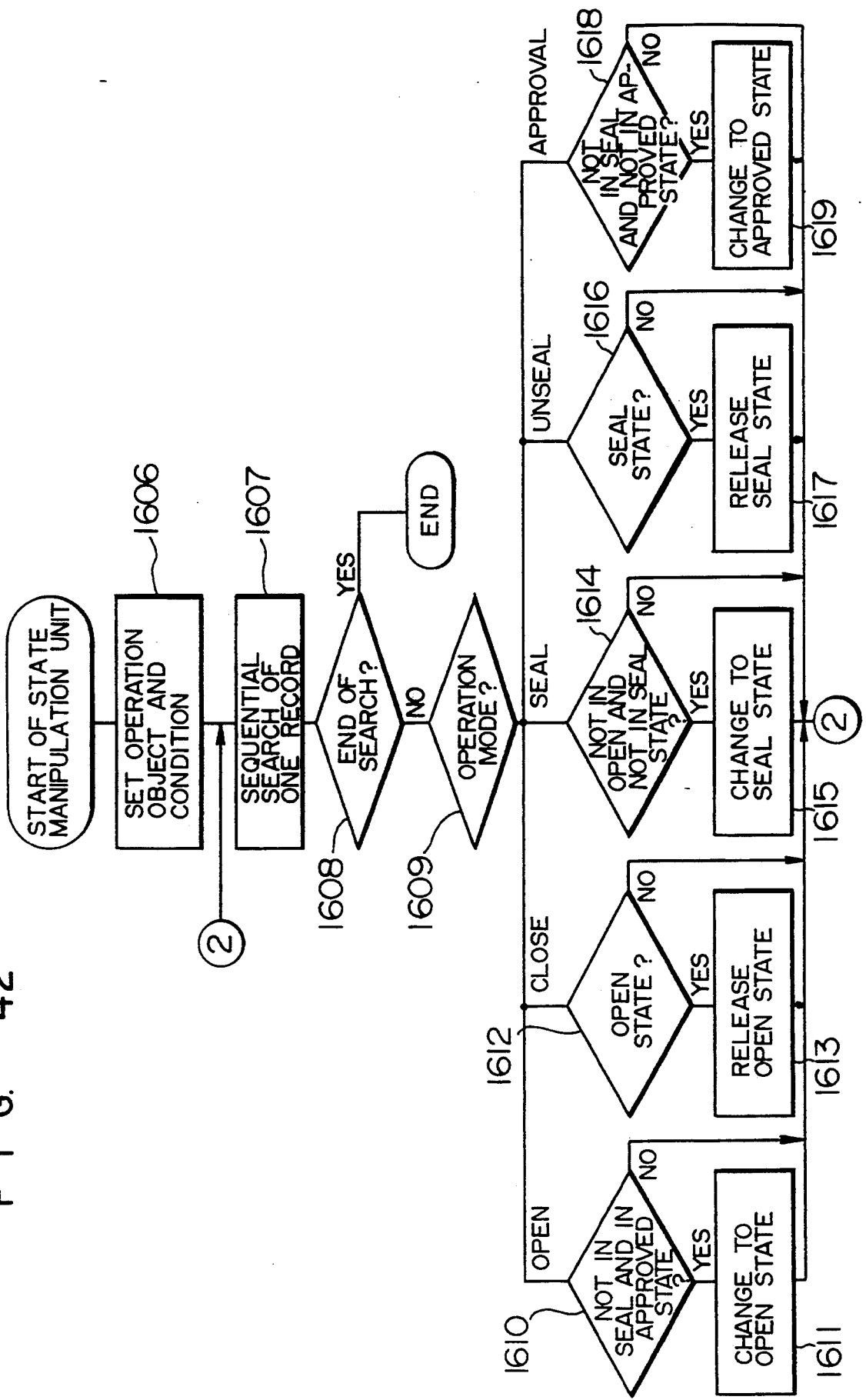

The process flow by the state manipulation unit 1600 is shown in FIG. 42. Since the state is managed in units of record, the processes become different from the first embodiment. First, a record having a designated condition is searched from the designated operation object (table) (steps 1606, 1607). If the search is not completed (step 1608), the operation mode is checked (step 1609) and the following processings are carried out.

(1) Open Operation

The record state is checked (step 1610), and if the record is in the approved state and not in the seal state, the state information of the record is set in the open state (step 1611).

(2) Close Operation the record state is checked (step 1612), and if the record is in the open state, the open state is released to make the record state information return to the approved state (step 1613).

(3) Seal Operation

The record state is checked (step 1614), and if the record is not in the open state and in the seal state, i.e., if the record is not in the seal state and in the unsettled or approved state, the state information of the record is set in the seal state (step 1615).

(4) Unseal Operation

The record state is checked (step 1616), and if the record is in the seal state, the seal state is released and the state information of the record is set in the unseal state (step 1617).

(5) Approval Operation

The record state is checked (step 1618), and if the record is in the unsettled state and not in the seal state, the state information of the record is set in the approved state (step 1619).

The above processes (steps 1607 to 1619) are repeated until the record search is completed. The process flow by the information definition function management unit 1400 and data dictionary management unit 1700 is the same as the first embodiment.

In this embodiment, the information state is managed in units of record. Therefore, the record state cannot be identified if the data dictionary only is referred as in the case of the first embodiment. To solve this, the record state information is returned when the record is searched.

A third embodiment obtained by further devising the second embodiment will be described below. In this embodiment, as shown in FIG. 30, the physical storage area in the data base 1020 is divided in correspondence with each state. As shown in FIG. 30, the storage area is divided into five areas including an unsettled state information storage area 1021, approved state information storage area 1022, seal (from unsettled) state information storage area 1023, seal (from approved) state information storage area 1024, and open state information storage area 1025.

In managing the state, the management information in the divided storage areas is stored in the data dictionary 1030 which is referred to by the information processing control unit 1200 or state processing control unit 1300 to thereby instruct the information manipulation unit 1500 or state manipulation unit 1600 to perform an information operation or state operation. The information state change is performed by transferring information between the storage areas.

Next, a fourth embodiment will be described. In this embodiment, the state information (refer to FIG. 29) stored in each record 1820 in the second embodiment is stored in each entry of a primary key index. The primary key index is an index formed in accordance with key data (primary key) for uniquely identifying the record 1820.

An example of the primary index having state information is shown in FIG. 43. The structure of an index is similar to an ordinary index. The difference is that an entry field to each record within a leaf node 1852 of the primary key index 1850 has a state information storage files 1853 for storing a state code representative of a state. The state operation is carried out by changing the state code within the state information storage field 1853. The processes by the database system 1010 for the information operation or state operation request are similar to the second embodiment. The difference is that information search is carried out by using the primary key index, and that the state is checked when searching the index.

The advantageous effect of this embodiment is that the number of input/output operations relative to the data portion can be reduced when searching the information having a designated condition. A pointer group of a record to be searched can be obtained by merging the pointer groups, between one pointer group to a record which satisfies the condition obtained from the index formed in the condition designated field, and the other pointer group to a record having the state to be searched. By first identifying records at the level of index, an actual record 1820 group is then read.

In the fourth embodiment, the primary key index 1850 has been used. Next, a fifth embodiment will be described which uses the state information itself as an index.

Figure 44:
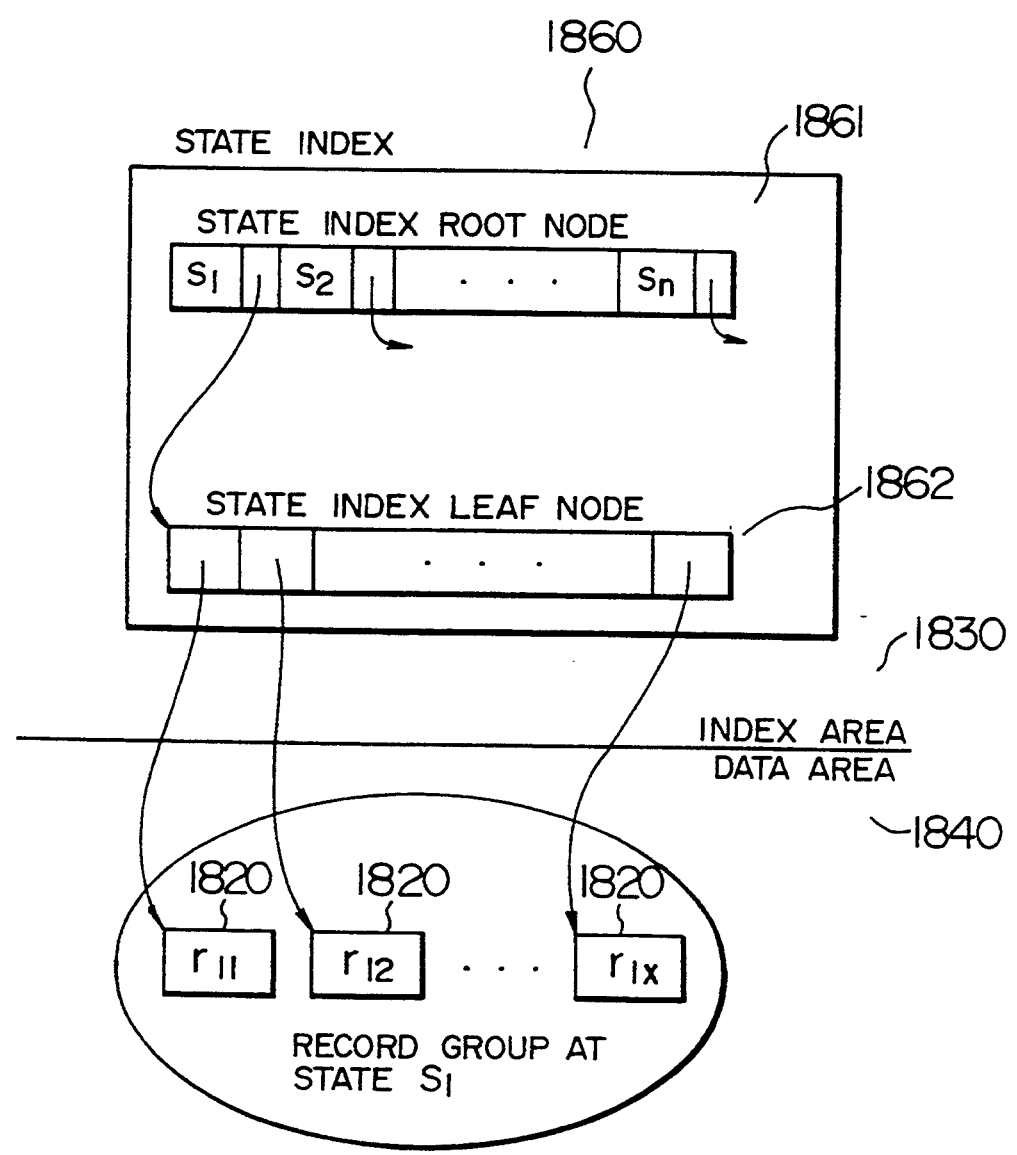
FIG. 44 shows an example of the structure of a state index.

An example of the structure of a state index 1860 used in this embodiment is shown in FIG. 44. The state index 1860 has a hierarchy of only two levels one being a root node 1861 and the other a leaf node 1862. The roof node 1861 is constructed of a code representative of each state, and a pointer to the leaf node 1862 for each state. The leaf node 1862 is a pointer list for a record of each state. The state change is realized by moving pointers between the leaf nodes 1862. If the position and state of pointers within the root node 1861 are arranged to be in correspondence with each other, only pointers to the leaf nodes 1862 of respective states may be stored.

According to this embodiment, a record of a particular state can be searched easily and at high speed. The merging process between pointers as shown in the fourth embodiment can also be realized easily. This embodiment may be used together with the second to fourth embodiments.

It is important in the practical world for the information state management to have such information who, what, when, and how particular information was operated. Therefore, if the history information on such state operations is stored in the database management system 1010, the information becomes useful for a user. In a sixth embodiment hereinunder described, the data base management system 1010 manages the record of state operations requested by a user.

The state processing control unit 1300 shown in FIG. 24 receives a state operation request. After completion of the processing, the record information of the state operation request is stored in a state operation record management table 1035 in the data dictionary 1030 via the data dictionary management unit 1700.

An example of the format of the record information is shown in FIG. 31. In FIG. 31, reference numeral 1036 represents an execution user, 1037 an execution data, and 1038 an execution request (request object, request state operation, request state operation condition). The state operation record management table 1035 is assumed to be provided one per one system. However, this table may be provided for each user or for each table. The information processing control unit 1200 receives a search request by a user (information manager) for the table 1035, and returns the results. Similarly, upon reception of a deletion request, the information is regarded unnecessary so that it is deleted. Addition and change are not allowed.

Lastly, a seventh embodiment will be described which shows a document management system 1900 using the database management system 1010 having the state management function. In this embodiment, the document management system 1900 and database management system 1010 run on the computer 1040 shown in FIG. 25. If a dispersed system is used, they may run on another computer.

The document management system 1900 manages the document information by using the database management system 1010. Upon reception of a user request for the document information, the corresponding database operation request is issued to the database management system 1010, to thereby realize the operation function for the document information such as registration, change, aborting, approval, open/close, seal/unseal.

Figure 32:
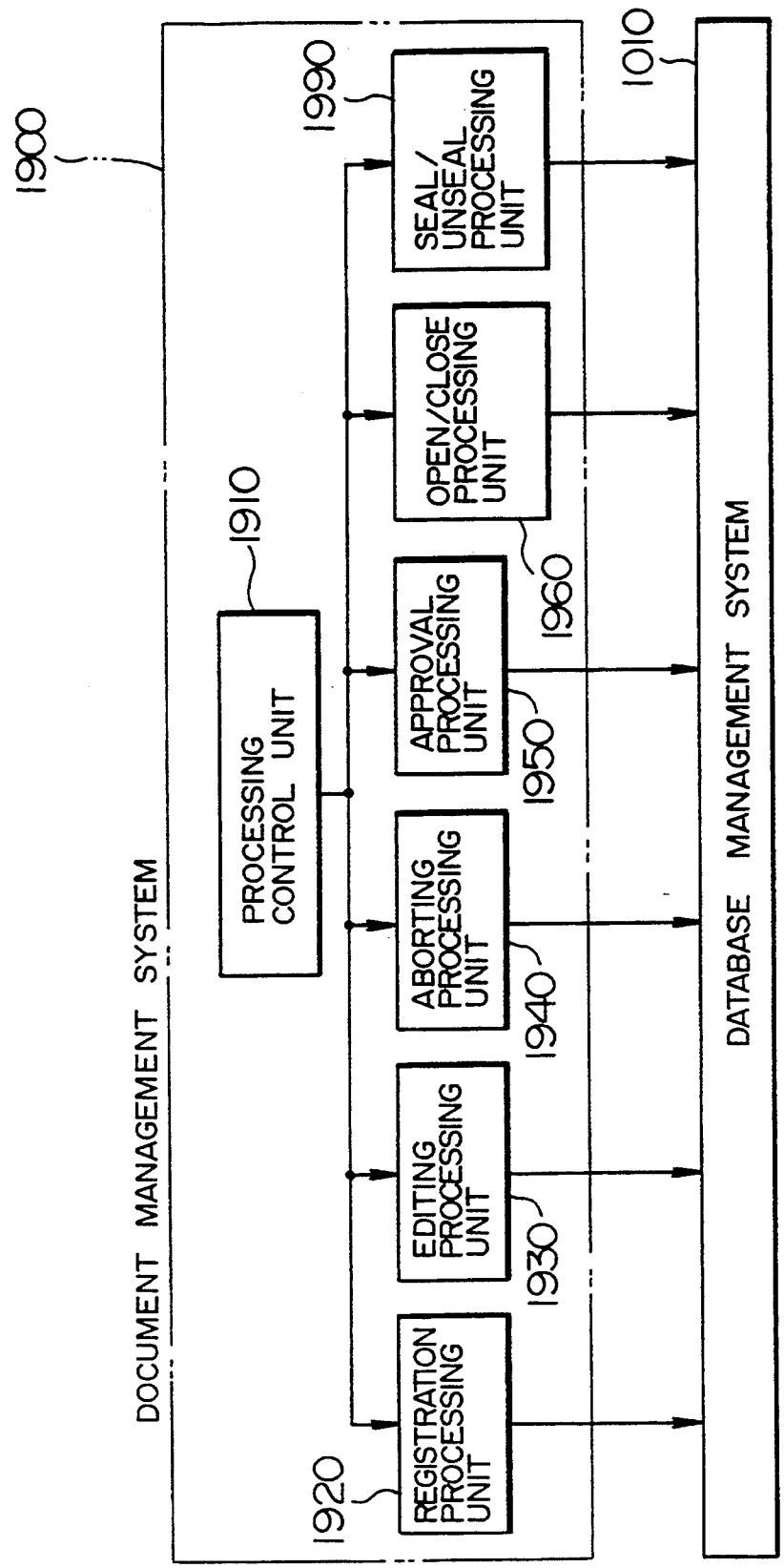
FIG. 32 show an example of a functional arrangement of the document management system using the database management system of this invention.

The document management system 1900 in FIG. 32, is constructed of a processing control unit 1910 for receiving a user request and selecting processes in accordance with the user request, and those units for managing the processes for the user request, the units including such as registration processing unit 1920, editing processing unit 1930, aborting processing unit 1940, approval processing unit 1950, open/close processing unit, and seal/unseal processing unit 1970. Each processing unit transforms the user request into a database operation request corresponding to the user request, to thereby request the database management system 1010 to execute the processes (refer to FIG. 32).

According to this embodiment, a user configuring a document management system can easily develop it because the operation such as approval, open/close, and seal/unseal can be transformed directly into a data base operation request. In addition, the information state management can be passed to the database management system so that the management does not become cumbersome.

As described so far, according to the database management method of this invention, it becomes possible to realize the state management of the information stored in the database, as a function which the database management system provides. Therefore, the database management method can be realized which reduces the burden on a user (information manager, information user), and allows information operations matching the information management in the practical world. Programs as one type of the database may be managed with the similar method.

We claim:

1. An information life cycle management system including a storage device for storing information composed of a database and a program, and a data processing device for processing information objects each of which is a block of information in the storage device, said data processing device comprising:
   means for defining a plurality of information life cycle states associated with the information, among which states the information is transformable;
   means for defining an available operation for said information associated with each of said states;
   means for selecting one of said states for said information; and
   means for performing at least one of the available operations on the information.

2. An information life cycle management system according to claim 1 further comprising information life cycle operation history management means for recording an operation history in accordance with the information life cycle state operation executed for said information object, and an historic record of information access operations performed on each information life cycle state.

3. An information life cycle management system including a storage device for storing information comprised of a database and a program, and a data processing device for processing information objects each of which is a block of information in the storage device, said data processing device comprising:
   information accessor management means for managing accessors to the information with an available operation type and specified uses to an information object managed by said data processing device, based on an associated information life cycle state;
   information life cycle management means for controlling processing of an information object managed by said data processing device, based on information life cycle states starting with the generating state of said information object and ending with aborting state of said information object; and
   information access means for generating, via the data processing device, an information access language governing use of said information object, including means for selecting a proper access method based on the information life cycle state of said information object and means for execution thereof.

4. An information life cycle management system according to claim 3 further comprising information life cycle state presentation means for selectively outputting from the data processing device, when information is presented to a user, discrimination information between information life cycle states of said information objects, and visually distinguishably displaying, when displaying said information objects on a terminal display screen, the information life cycle states of respective information objects.

5. An information life cycle management system according to claim 3 further comprising approval hierarchy control means for, detecting a presence of at least one approver relative to said information object and, in an event when said at least one approver forms an approver hierarchy, managing the information life cycle state transformation in accordance with said approver hierarchy.

6. An information life cycle management system according to claim 3 further comprising memory space management means for generating, from the data processing device, a data processing space within the storage device in correspondence with each information life cycle state of said information object managed by said data processing device determining said data processing space in accordance with the information life cycle state of said information object block to be processed, and processing data on said determined data processing space.

7. An information life cycle management system according to claim 3 further comprising notice means adapted for generating a notify signal when the life cycle state of said information object is changed the administrators or users of the change contents.

8. An information life cycle management system according to claim 3 further comprising storage management means for storing said information object based on the information life cycle state.

9. A program library management method for managing program development by control of access, operations, and states associated therewith in a computer software development environment comprising the steps of:
   storing information comprised of a program library in an associated data storage device;
   selectively processing information objects, each of which forms a stored block of information relating to the program library;
   managing accessors to the program library, which accessors include data specifying an available operation type and targeted uses for said information object managed by said data processing device, based on an information life cycle state;
   controlling the processing of an information object managed by said data processing device, based on information life cycle states starting with the generating state of said information object and ending with aborting state of said information object; and
   generating, from the data processing device, an information access language governing use of said information object, said generating step including selecting a proper access method based on the information life cycle state of said information object; and
   executing the access method.

10. A data base management method for managing development data in a database development environment comprising the steps of:
    storing information comprised of a development library in an associated data storage device;
    processing, in a data processing device, information objects each of which forms a stored block of information relating to the development library;
    managing accessors to the development library with an available operation type and specified uses for said information object managed by said data processing device, based on an information life cycle state;

controlling processing of an information object managed by said data processing device, based on information life cycle states starting with the generating state of said information object and ending with aborting state of said information object; and generating, from the data processing device, an information access language governing use of said information object, said generating step including selecting a proper access method based on the information life cycle state of said information object; and executing the access method.

11. A management method for managing of at least one of a document and drawing in a development environment comprising the steps of:

storing information comprised of at least one of a document and a drawing in an associated data storage device;

processing, in a data processing device, information objects, each of which forms a stored block of said information;

managing accessors to said information stored in the associated data storage device with an available operation type and specified uses for said information object managed by said data processing device, based on an information life cycle state;

controlling processing of each of said information objects managed by said data processing device, based on information life cycle states starting with the generating state of said information object and ending with aborting state of said information object; and generating, from the data processing device, an information access language for governing use of said information object, said generating step including selecting a proper access method based on the information life cycle state of said information object; and executing the access method.

12. A data management method for managing information which transforms from an incomplete state where information is not completed and being generated to an abort state where the information is deleted, comprising the steps of:

defining orders of transformation as to information life cycle states of the information via an associated data processing device;

defining operations available on the data processing device for information as to each of said states;

selecting one of said states for said information; and controlling the data processing device such that the operation to be performed as to information of the selected state is based on the defined operation of the information.

13. A database management method according to claim 12 further comprising the step of outputting data indicating a state of information and storing information together with data indicating a state of the information, which information is stored in an associated memory means.

14. A database management method according to claim 13 further comprising the step of generating, via the data processing device, areas for storing the information for every state.

15. A database management method according to claim 13 further comprising the step of generating, via the data processing device, an index corresponding to information stored in said memory means and generating, via the data processing device, said data indicating a state of the information as data for managing the information.

16. A database management method according to claim 12 further comprising a step of adding an information life state identifier to a control area of an associated file as said storage area of said information life cycle state identifier.

17. A database management method according to claim 12 wherein:

said step of defining states includes a step of defining first, second and third states as said states;

said step of defining operation available for information as to each of said states include a step of defining only reading as an available executable operation for said first state, a step of defining both reading and updating for said second state, and a step of defining neither reading nor updating for said third state.

18. A database management method according to claim 12 further comprising a step of generating, as said information life cycle state meaning the executable operation of said information object, a state (open state) wherein only reading is allowed for all users of the system, a state (approved state) wherein only reading is allowed for only those users authorized to read the information object, a state (incomplete state) wherein only those users authorized to operate the information object are allowed to execute permitted operations, and a state (seal state) wherein neither reading nor updating is allowed for all users of the system.

19. A database management method according to claim 12, wherein said step of defining operations defines one of an open state, an approved state, an incomplete state and a seal state for information having been generated.

20. A database management method according to claim 12, wherein said step of defining operations sets an incomplete state for the information object immediately after stored in the database, and receives an information life cycle transform request by a user to change the designated information life cycle state, said information life cycle transform request including a request for changing incomplete state information associated with the incomplete state into the approved state upon an approval operation request, a request for changing approved information into the open state upon an open operation request, a request for changing the open state information into an approved state upon a close operation request, a request for changing incomplete or approved information into seal state upon completion of a seal operation, and a request for changing seal information into the incomplete state or the approved state upon an unseal operation request.

21. A database management method according to claim 12, further comprising the step of storing in a memory means a history of operations by which a state of information is transformed, wherein the history is retrievable.

22. A database management method according to claim 12, further comprising the steps of:

classifying information for every state and generating, via the data processing device, an index pointing the information; and storing said classified information in a memory means.

23. A database management method according to claim 12, wherein the information is documents or drawings.

24. An information life cycle management system according to claim 1, further comprising:
the defining means including means for defining, by an information life cycle control language, a relation between the operations and a destination state transformed from an originating state in accordance with the operation performed for the information in the originating state; and
means for transforming, in accordance with the defined relation, a state of said information for which the operation is performed.

25. An information life cycle management system according to claim 3, further comprising:
information object management means for generating, via the data processing device, an information object definition language adapted for administrator defined information structure attributes and information life cycle state of, said information object managed by said data processing device; and
means for storing, in the storage device, said information object in accordance with contents defined by said language.

26. A database management method according to claim 12, wherein said step of defining orders includes a step of determining a relation among a destination state, an originating state and an operation performed for the originating state which represents that the originating state is transformed to the destination state in accordance with the operation performed for the information in the originating state based on the defined operation, said method further comprising the step of transforming, in accordance with a defined relation, a state of information for which the operation is performed.

27. A data management method according to claim 12, wherein the state is transformed in accordance with degree of completion of the information starting from a generating state and ending with aborting state.

28. A data management method according to claim 13, further comprising the step of storing the information and the data indicating a state of the information in an area of said memory means.

29. A database management method according to claim 12 further comprising the step of determining an object performable on an operation for every state.

30. A data management apparatus comprising:
means for determining states among which information is transformable;
means for determining available operations for said information associated with each of said states;
means for selecting one of said states for information; and
means for limiting performable operations as to said information based on the defined operation of the information.

31. A data management apparatus according to claim 30, further comprising:
means for determining a relation between the operations and a destination state transformed from an originating state in accordance with the operation performed for the information in the originating state; and
means for transforming, in accordance with the defined relation, a state of information for which the operation is performed.

32. A database management method comprising the steps of:
determining states among which information stored in a database is transformable;
determining operations available for said information stored in the database as to each of said states;
selecting one of said states for said information stored in the database; and
limiting operations on information stored in the database based on the defined available operations.

33. A database management method according to claim 32, further comprising the steps of:
determining a relation between the operations and a destination state transformed from an originating state in accordance with the operation performed for the information in the originating state; and
transforming, in accordance with the defined relations, a state of information for which the operation is performed.

34. A data management method according to claim 26, wherein said step of controlling includes a step of limiting operation on information of the selected state to that defined in said step of defining.

35. A data management method according to claim 26, wherein said information states of the information includes at least three among the incomplete state where information is not completed and being generated, a complete state where the information has been completed, an approved state where the information has been approved, an open state where the use of the information has been allowed, a seal state where an access to the information other than by owner thereof is prohibited, and the abort state where the information is deleted.

36. A data management method according to claim 35, wherein the step of defining operation includes:
a step of defining at least one of a completion declaration operation, a seal operation, and an abort operation as the operation available for the information as to said incomplete states;
a step of defining at least one of an approval operation and a refusal operation for the information as to said complete states;
a step of performing one of an open, refusal, seal and abort operation as to information objects with an approved state;
a step of performing a close operation on an information object having an open state; and
a step of performing an unseal and abort operation on an information object in a sealed state.

37. A data management method according to claim 35, wherein said step of defining the relation includes:
a step of transforming information in the incomplete state to the completed state in response to the completion declaration operated as to the information in the incomplete state;
a step of transforming information into a complete state upon completion thereof by the information generator;
a step of transforming information into a complete state to an approved state upon approval thereof;
a step of transforming information into an approved state to an open state when it is needed by a plurality of users;
a step of transforming information into an open state to an approved state upon completion of a close operation thereon;
a step of selectively transforming information into a complete state to one of an incomplete state and an approved state;
a step of selectively transforming information into one of an incomplete state, a complete state and an approved state to a sealed state; and
a step of selectively moving information into an abort state from any other state.

* * * * *